(12) United States Patent
Onishi et al.

(10) Patent No.: US 7,656,278 B2
(45) Date of Patent: Feb. 2, 2010

(54) THEFT PREVENTION APPARATUS OF LEISURE VEHICLE

(75) Inventors: Yoji Onishi, Kobe (JP); Kenichi Furuhashi, Akashi (JP); Naoki Kawamura, Takasago (JP); Satoru Watabe, Akashi (JP); Tomoyuki Takahashi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 655 days.

(21) Appl. No.: 11/112,866

(22) Filed: Apr. 22, 2005

(65) Prior Publication Data

US 2005/0242929 A1 Nov. 3, 2005

(30) Foreign Application Priority Data

Apr. 26, 2004 (JP) .............................. 2004-129907
Apr. 6, 2005 (JP) .............................. 2005-109998

(51) Int. Cl.
*B60R 25/10* (2006.01)

(52) U.S. Cl. ........................... 340/426.12; 340/426.23; 340/427

(58) Field of Classification Search . 340/426.1–426.23, 340/427
See application file for complete search history.

(56) References Cited

U.S. PATENT DOCUMENTS

| 4,260,982 | A | * | 4/1981 | DeBenedictis et al. | 340/539.24 |
| 5,349,329 | A | * | 9/1994 | Smith | 340/539.21 |
| 5,382,948 | A | * | 1/1995 | Richmond | 340/825.36 |
| 5,486,806 | A | * | 1/1996 | Firari et al. | 340/426.11 |
| 5,623,245 | A | * | 4/1997 | Gilmore | 340/426.12 |
| 5,838,227 | A | * | 11/1998 | Murray | 340/539.21 |
| 6,232,884 | B1 | * | 5/2001 | Gabbard | 340/825.72 |
| 6,861,947 | B2 | * | 3/2005 | Albert | 340/426.11 |
| 2002/0190843 | A1 | | 12/2002 | Konno et al. | |
| 2004/0063477 | A1 | | 4/2004 | Konno | |

FOREIGN PATENT DOCUMENTS

| EP | 1232918 | 8/2002 |
| EP | 1232919 | 8/2002 |
| EP | 1262925 | 12/2002 |
| EP | 1273492 | 1/2003 |
| JP | 08-120992 | 5/1996 |
| JP | 09-280973 | 10/1997 |

* cited by examiner

*Primary Examiner*—Brent Swarthout
(74) *Attorney, Agent, or Firm*—Alleman Hall McCoy Russell & Tuttle LLP

(57) ABSTRACT

A theft prevention apparatus of a leisure vehicle equipped with a rider's seat which opens outside is disclosed. The theft prevention apparatus typically includes a portable transmitter configured to transmit a user identification code by radio at predetermined intervals during travel of the vehicle, a vehicle receiver mounted in the vehicle and configured to receive the user identification code which is transmitted by radio from the portable transmitter, a controller coupled to the vehicle receiver through a signal line or by radio, and an alarm device mounted in the vehicle and configured to indicate an alarm to inform the rider that the portable transmitter has been lost, wherein the controller is configured to determine whether or not the vehicle receiver has received the user identification code transmitted from the transmitter within a predetermined time during travel of the vehicle, and to execute control to cause the alarm device to indicate the alarm when the controller determines that the receiver does not receive the user identification code within the predetermined time.

16 Claims, 18 Drawing Sheets

THEFT PREVENTION APPARATUS OF LEISURE VEHICLE

BACKGROUND OF THE INVENTION

1. Field of the Invention

The present invention relates to a theft prevention apparatus configured to prevent theft (defined to include a loss of a transmitter as well as theft in a general sense) of leisure vehicles such as motor vehicles including motorcycles, three-wheeled vehicles, and four-wheeled vehicles equipped with riders' seats which open outside, personal watercraft (PWC), etc.

2. Description of the Related Art

Typically, a motorcycle or personal watercraft, each of which is a type of leisure vehicle, is equipped with a rider's seat which is open to the outside. So, a rider may freely mount the rider's seat. During operation, in many cases a rider steers the vehicle wearing gloves. Therefore, it is difficult for the rider to take out a key from a pocket or the like with a hand wearing a glove.

When the rider comes closer to a predetermined distance away from the vehicle, a user identification (ID) code is transmitted from a portable transmitter put in the pocket or the like and is received by a receiver equipped in the vehicle. A controller built into the vehicle determines whether or not the received code matches a correct user ID code. If it is determined that the received code matches the correct user ID code, the controller configures the vehicle for a start-up condition, whereas if it is determined that the received code does not match the correct user ID code, the controller configures the vehicle to an unsteerable condition. Such a remote-controllable theft prevention apparatus is disclosed in Japanese Laid-Open Patent Application Publication No. 8-120992.

However, since leisure vehicles such as motorcycles or personal watercraft are equipped with a rider's seat which is open to the outside as described above, anyone can mount the seat. If the rider (owner) carrying the transmitter associated with the vehicle comes closer to a predetermined distance, for example, 10 meters away from the vehicle, then the user ID code matches the correct user ID code, so that someone riding on the seat, other than the rider (owner), may start-up an engine of the vehicle. As a result, there exists a chance of theft of the vehicle.

Furthermore, since the rider's seat is open to the outside as mentioned above, the transmitter may fall off of the pocket or the like and may be lost during travel of the vehicle. In that case, if the rider (owner) stops the vehicle and turns off a power supply of the vehicle at a gas station or the like, even the rider (owner) cannot start-up the vehicle again.

SUMMARY OF THE INVENTION

The present invention addresses the above described conditions, and an object of the present invention is to provide a theft prevention apparatus of a leisure vehicle which is capable of quickly detecting a loss of a transmitter configured to transmit a user ID code while a rider is steering the vehicle or pushing the vehicle, carrying the transmitter in a pocket or the like, and which is capable of improving a theft prevention function.

According to one aspect of the present invention, there is provided a theft prevention apparatus of a leisure vehicle equipped with a rider's seat which is open to the outside, the theft prevention apparatus comprising: a portable transmitter configured to transmit a user identification code by radio at predetermined intervals during travel of the vehicle; a vehicle receiver mounted in the vehicle and configured to receive the user identification code which is transmitted by radio from the portable transmitter; a controller coupled to the vehicle receiver through a signal line or by radio; and an alarm device mounted in the vehicle and configured to indicate an alarm to inform the rider that the portable transmitter has been lost; wherein the controller is configured to determine whether or not the vehicle receiver has received the user identification code transmitted from the portable transmitter within a predetermined time during travel of the vehicle, and to execute control to cause the alarm device to indicate the alarm when the controller determines that the receiver does not receive the user identification code within the predetermined time.

In accordance with the theft prevention apparatus of the leisure vehicle thus constructed, during travel of the vehicle, the controller receives the user identification code which is transmitted by radio from the portable transmitter in the vehicle receiver at predetermined intervals (travel distance intervals or time intervals) and determines whether or not the received user identification code matches a correct user identification code stored therein. If the transmitter has fallen out of a pocket or the like of the rider, then the vehicle receiver does not receive the user identification code transmitted from the portable transmitter. In this case, the controller determines that the portable transmitter has fallen off of the rider, and causes the alarm device to immediately indicate an alarm. This makes it possible for the rider to easily recognize that the transmitter has fallen off. The alarm device may desirably be a horn (alarm emitter) mounted in the leisure vehicle, an alarm light installed on a meter or gauge, or the vehicle, an alarm sound emitter provided on the meter or the vehicle, a head light, a direction indicator, or otherwise, an alarm indicator utilizing a CAN (controller area network).

In some cases, the leisure vehicle may be stolen if the rider (owner), carrying the transmitter, comes closer than a predetermined distance away from the vehicle, with a third party (thief) riding on the rider's seat of the vehicle, or the third party (thief) is able to start-up the vehicle in some way or other. However, the process for determining whether or not the user identification code has been received and the process for determining whether or not the received user identification code matches the stored user identification code are carried out during travel of the vehicle, and if it is determined that the user identification code is not received or these two user identification codes do not match, the alarm device emits an alarm. This enables the rider (owner) or a third party (policeman) to recognize that the vehicle has been stolen.

According to another aspect of the present invention, there is provided a theft prevention apparatus of a leisure vehicle equipped with a rider's seat which opens outside, the theft prevention apparatus comprising: a vehicle receiver mounted in the vehicle and including a vehicle transmitter configured to transmit a request signal by radio at predetermined travel distance intervals during travel of the vehicle; a portable transmitter including a transmitter receiver configured to receive the request signal which is transmitted by radio from the vehicle transmitter of the receiver, the portable transmitter being configured to transmit a reply signal by radio to the vehicle receiver in response to the request signal, the reply signal being received by the vehicle receiver; a controller coupled to the vehicle receiver through a signal line or by radio; and an alarm device mounted in the vehicle and configured to indicate an alarm to inform the rider that the portable transmitter has been lost; wherein the controller is configured to determine whether or not the vehicle receiver has received the reply signal transmitted from the portable transmitter within a predetermined time after the vehicle receiver has transmitted the request signal by radio to the portable transmitter, and to execute control to cause the alarm device to indicate the alarm when the controller determines that the vehicle receiver does not receive the reply signal within the predetermined time.

In accordance with the theft prevention apparatus of the leisure vehicle thus constructed, during travel of the vehicle, the vehicle transmitter transmits the request signal by radio to the transmitter receiver at predetermined distance intervals during travel of the vehicle, and the transmitter receiver receives the request signal and transmits the reply signal by radio. In this configuration, if the controller determines that the vehicle receiver does not receive the reply signal which is transmitted by radio from the portable transmitter in response to the request signal at the predetermined travel distance intervals, it determines that the transmitter that should be carried in the pocket or the like has fallen out. Upon this determination, the controller causes the alarm device to indicate an alarm. Since it is determined whether or not the transmitter has fallen out every predetermined distance, irrespective of a travel speed of the vehicle, i.e., even at a high speed, the transmitter which has been lost can be easily found.

According to another aspect of the present invention, there is provided a theft prevention apparatus of a leisure vehicle equipped with a rider's seat which opens outside, the theft prevention apparatus comprising: a vehicle receiver mounted in the vehicle and including a vehicle transmitter configured to transmit a request signal by radio at predetermined time intervals during a stopped state of the vehicle; a portable transmitter including a transmitter receiver configured to receive the request signal which is transmitted by radio from the vehicle transmitter of the receiver, the portable transmitter being configured to transmit a reply signal by radio to the vehicle receiver in response to the request signal, the reply signal being received by the vehicle receiver; a controller coupled to the vehicle receiver through a signal line or by radio; and an alarm device mounted in the vehicle and configured to indicate an alarm to inform the rider that the portable transmitter has been lost; wherein the controller is configured to determine whether or not the vehicle receiver has received the reply signal transmitted from the portable transmitter within a predetermined time after the vehicle receiver has transmitted the request signal by radio to the portable transmitter, and to execute control to cause the alarm device to indicate the alarm when the controller determines that the vehicle receiver does not receive the reply signal within the predetermined time.

In accordance with the theft prevention apparatus of the leisure vehicle thus constructed, during the stopped state of the vehicle, the vehicle transmitter transmits the request signal by radio to the transmitter receiver at predetermined time intervals, and the transmitter receiver receives the request signal and transmits the reply signal by radio. In this configuration, if the controller determines that the vehicle receiver does not receive the reply signal which is transmitted by radio from the transmitter in response to the request signal at the predetermined time intervals, it determines that the transmitter to be carried in the pocket or the like has fallen off. Upon this determination, the controller causes the alarm device to indicate an alarm. Since it is determined whether or not the transmitter has fallen off every predetermined time interval, an area where the transmitter has fallen off is easy to locate. As a result, the transmitter is easily found.

According to another aspect of the present invention, there is provided a theft prevention apparatus of a leisure vehicle equipped with a rider's seat which opens outside, the theft prevention apparatus comprising: a vehicle receiver mounted in the vehicle and including a vehicle transmitter configured to transmit a request signal by radio at predetermined time intervals during a stopped state of the vehicle or at predetermined travel distance intervals during travel of the vehicle; a portable transmitter including a transmitter receiver configured to receive the request signal which is transmitted by radio from the vehicle transmitter of the receiver, the portable transmitter being configured to transmit a reply signal by radio to the receiver in response to the request signal, the reply signal being received by the vehicle receiver; a controller coupled to the vehicle receiver through a signal line or by radio; and an alarm device mounted in the vehicle and configured to indicate an alarm to inform the rider that the portable transmitter has been lost; wherein the controller is configured to determine whether or not the vehicle receiver has received the reply signal transmitted from the portable transmitter within a predetermined time after the vehicle receiver has transmitted the request signal by radio to the portable transmitter, and to execute control to cause the alarm device to indicate the alarm when the controller determines that the vehicle receiver does not receive the reply signal within the predetermined time.

In accordance with the theft prevention apparatus of the leisure vehicle thus constructed, the vehicle transmitter transmits the request signal by radio to the transmitter receiver at predetermined time intervals during the stopped state of the vehicle, while the vehicle transmitter transmits the request signal by radio to the transmitter receiver at predetermined distance intervals during the travel of the vehicle, and the transmitter receiver receives the request signal and transmits the reply signal by radio. In this configuration, if the controller determines that the vehicle receiver does not receive the reply signal which is transmitted by radio from the portable transmitter in response to the request signal at the predetermined time intervals during the stopped state of the vehicle or at the predetermined travel distance intervals during the travel of the vehicle, it determines that the transmitter that should be carried in the pocket or the like has fallen out. Upon this determination, the controller causes the alarm device to indicate an alarm. Since it is determined whether or not the transmitter has fallen off every predetermined time interval during the stopped state of the vehicle or every predetermined distance during travel of the vehicle, an area where the transmitter has been fallen off is easy to locate. As a result, the transmitter is easily found.

In the theft prevention apparatus of the one aspect, the portable transmitter may include a transmitter receiver and the vehicle receiver includes a vehicle transmitter; and the controller may be configured to instruct the vehicle transmitter to transmit a response signal to the transmitter receiver, when the controller determines that the user identification code which is transmitted by radio from the portable transmitter matches a correct user identification code, and the transmitter receiver of the portable transmitter is configured to receive the response signal transmitted from the vehicle transmitter. The theft prevention apparatus thus configured is highly reliable.

In the theft prevention apparatus of the one aspect, the controller may be configured to determine that the vehicle receiver does not receive the user identification code when the vehicle receiver does not receive the user identification code a predetermined number of times. In this configuration, since malfunction of the theft prevention apparatus is inhibited, the theft prevention apparatus is highly reliable.

In the above theft prevention apparatus, the request signal may be a user identification code request signal and the reply signal is a user identification code. The controller may be configured to, upon reception of the user identification code, compare the received user identification code to a correct user identification code stored therein to determine whether or not the received user identification code matches the correct user identification code.

In the above theft prevention apparatus, the controller may determine that the vehicle receiver does not receive the reply signal when the vehicle receiver does not receive the reply signal which is to be transmitted in response to the request signal which has been transmitted plural times. In this configuration, since malfunction of the theft prevention apparatus is inhibited, the theft prevention apparatus is highly reliable.

The controller may be configured to reduce a transmission interval of the request signal which is transmitted by radio from the vehicle transmitter, when the vehicle receiver does not receive the reply signal which is to be transmitted in response to the request signal. Thereby, it is possible to immediately detect that the transmitter has fallen off, or to display information on the alarm device, indicating occurrence of the theft of the vehicle.

The controller may be configured to reset a travel distance meter equipped in the vehicle or data regarding an elapse of time, when the controller determines that the vehicle receiver dos not receive the reply signal in response to the request signal. Thereby, it is possible to easily locate the spot where the transmitter has fallen off (has been lost). The rider can find the transmitter by traveling back a distance which is counted from the time point when the meter has been reset.

The travel distance meter may be a trip meter.

The portable transmitter may include a self-indicator configured to operate when determining that the transmitter receiver does not receive the request signal. Thereby, the transmitter which has fallen off (or has been lost) can be easily found.

The self-indicator may be a light emitting device or an alarm sound emitter. The LED is desirable, because it is capable of flashing with small power.

As should be appreciated, in accordance with the theft prevention apparatus of the leisure vehicle of the present invention, during the travel of the vehicle or during the stopped state of the vehicle, since the controller causes the alarm device to indicate an alarm when the transmitter to be carried in the pocket has fallen off of the rider, the rider can recognize that the transmitter has been lost, and easily find the lost transmitter.

The above and further objects and features of the invention will more fully be apparent from the following detailed description with accompanying drawings.

DETAILED DESCRIPTION OF THE PREFERRED EMBODIMENTS

Hereinafter, embodiments of a theft prevention apparatus of a leisure vehicle according to the present invention will be described with reference to the accompanying drawings.

Embodiment 1

Figure 1:
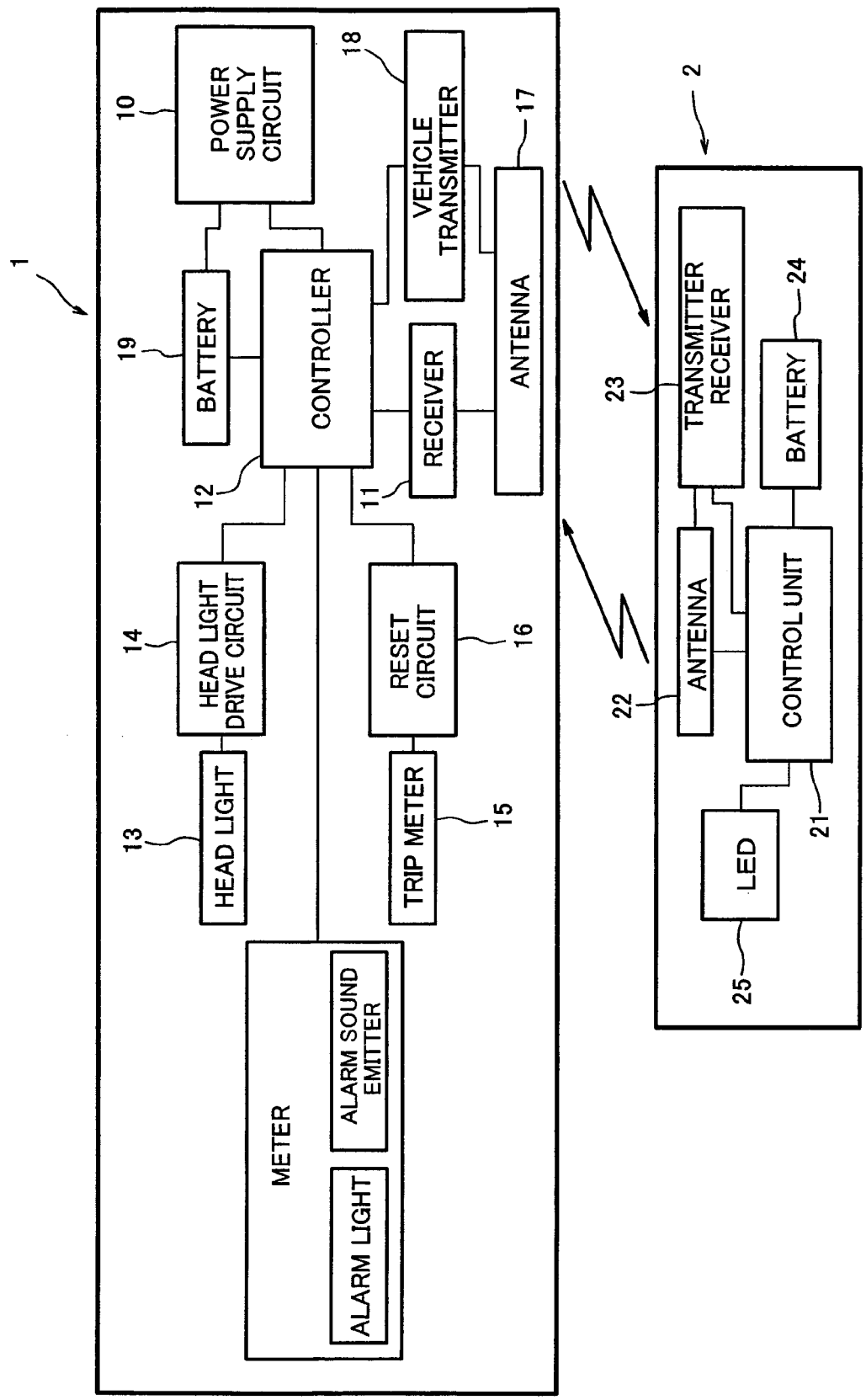
FIG. 1 is a block diagram schematically showing a configuration of a theft prevention apparatus of a motorcycle according to an embodiment of the present invention.
Figure 2:
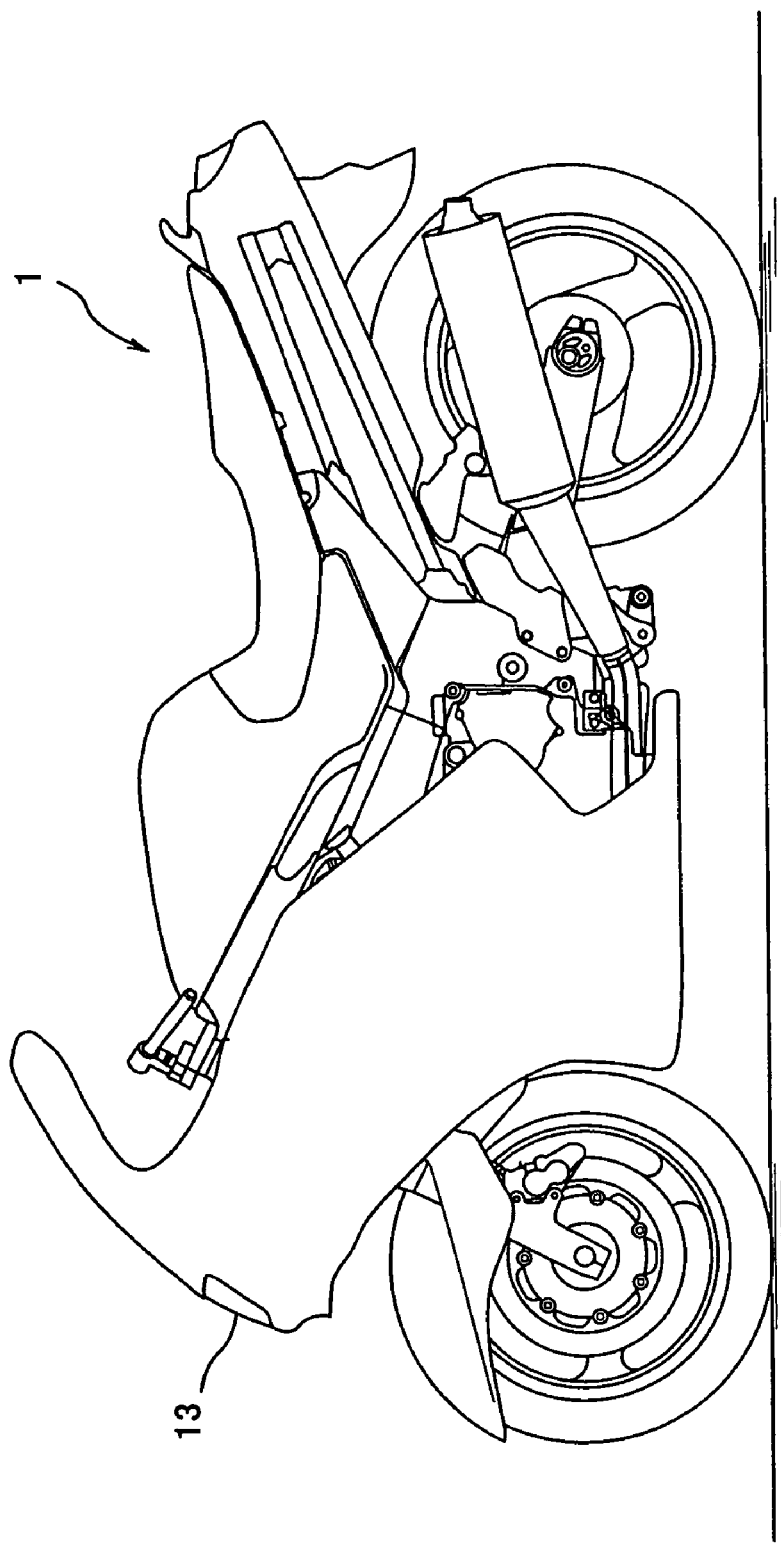
FIG. 2 is a side view showing a construction of the motorcycle of FIG. 1.

Turning now to FIG. 1, a motorcycle 1 is equipped with a theft prevention apparatus according to a first embodiment of the present invention, and a portable (pocketable) transmitter 2 is configured to be remote-controllable. The motorcycle 1 includes a receiver 11, a controller 12, a head light 13 also configured to serve as an alarm indicator, a head light drive circuit 14 configured to flash the head light 13 as the alarm indicator, a trip meter 15 configured to display a travel distance of the motorcycle 1, a reset circuit 16 configured to reset the trip meter 15, an antenna 17 connected to the receiver 11 and configured to receive a user identification (ID) code which is transmitted by radio from the transmitter 2, a vehicle transmitter 18 configured to transmit a response signal by radio to the transmitter 2, a battery 19, and a power supply circuit 10 configured to function as a main switch of the motorcycle 1. It shall be appreciated that the controller 12 may be an engine control unit (ECU) configured to control an engine and other components of the motorcycle 1, or otherwise may be additionally provided.

The transmitter 2 includes a control unit 21, an antenna 22 connected to the control unit 21, a transmitter receiver 23 configured to receive a response signal from the motorcycle 1 side, a battery 24, and an LED (light emitting diode) light (hereinafter simply referred to as LED) 25 which serves as a self-indicator.

The control unit 21 of the transmitter 2 is provided with a transmission circuit configured to transmit the user ID code at appropriate time intervals. The control unit 21 is configured to transmit the user ID code by radio from the transmission circuit thereof to the motorcycle 1 side through the antenna 22. The time intervals may be set so that the user identification code can be certified without wait time, for example, 0.2 second, or 10 seconds, within a range of 0.1 second to 5 minutes, desirably according to a travel speed of the motorcycle 1.

The control unit 21 is electrically connected to the battery 24, for example, a button battery, which serves as a power supply in this embodiment. The control unit 21 is communicatively coupled to the transmitter receiver 23 through a communication line and is configured to receive a response signal transmitted from the motorcycle 1 side and to determine whether or not the receiver 11 of the motorcycle 1 has received the user ID code.

The control unit 21 is electrically connected to the LED 25 and is configured to light the LED 25 after detecting that the control unit 21 does not obtain the response signal once or a predetermined number of consecutive times. The transmitter 2 is sized to be accommodated in a pocket or the like of shirt or pants to enable the rider to carry the transmitter 2 around. By way of example, a longitudinal length and a lateral length may be approximately 3 cm and approximately 2 cm, respectively, and a thickness may be approximately 0.5 cm.

The receiver 11 of the motorcycle 1 is communicatively coupled to the transmitter 2 by radio and the controller 12 through a communication line or by radio and is configured to receive the user ID code by radio from the transmitter 2 and to transmit the user ID code to the controller 12. The receiver 11 is coupled to the antenna 17 through a communication line.

Receiving the user ID code from the receiver 11, the controller 12 determines whether or not the received user ID code matches a user ID code pre-stored in a memory (not shown) contained therein. If it is determined that these two user ID codes match, the controller 12 executes control via a control line to cause the power supply circuit 10 to be turned ON. As a result, an ignition circuit of the engine is turned ON and a starter circuit is turned ON. Now, the engine of the motorcycle 1 is ready to start-up.

Under this condition, upon the rider pressing a starter button, the starter rotates to start-up the engine.

If it is determined that the two user ID codes match, the controller 12 instructs the vehicle transmitter 18 to transmit a response signal to the transmitter 2. In accordance with this instruction, the vehicle transmitter 18 transmits the response signal by radio to the transmitter 2 through the antenna 17. The transmitter 2 receives the response signal through the antenna 22 and the transmitter receiver 23.

On the other hand, if it is determined that the two user ID codes do not mach, the controller 12 maintains the power supply circuit 10 in an OFF-state. Therefore, an ignition circuit of the engine of the motorcycle 2 remains in the OFF-state, and the starter circuit remains in the OFF-state.

Under this condition, if anyone operates the starter button, the starter does not rotate. Or, if anyone pushes-start the motorcycle 1, the engine does not start-up.

The transmitter 2 may be provided with a transmission button which is configured to be pressed to allow the user ID code to be transmitted by radio. This makes it possible to inhibit wasteful power consumption in the battery 24 of the transmitter 2. Likewise, the motorcycle 1 may be provided with a reception button configured to be pressed for a predetermined time interval to allow power to be supplied from the battery 19 to the controller 12. This makes it possible to inhibit wasteful consumption in the battery 19 equipped in the motorcycle 1.

When the two user ID codes match and the rider starts-up the engine of the motorcycle 1, an electric wave (including electromagnetic wave) is desirably transmitted from the vehicle transmitter 18 and is received by the transmitter receiver 23 of the transmitter 2 to charge the battery 24 of the transmitter 2.

Figure 3:
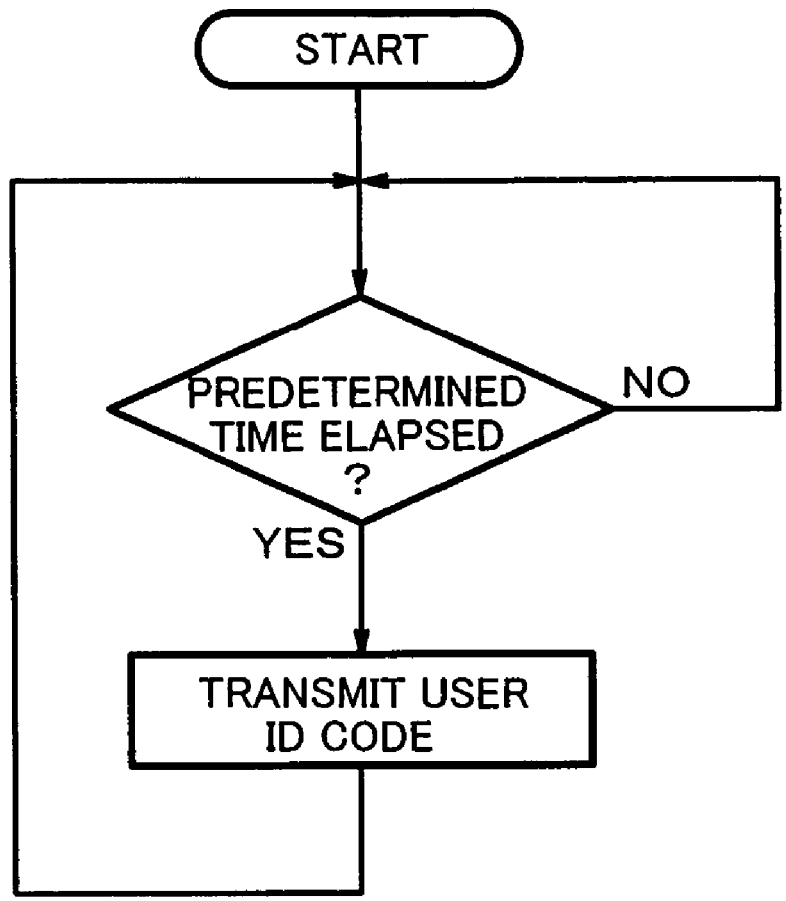
FIG. 3 is a flowchart showing a control process executed by a transmitter of the theft prevention apparatus according to a first embodiment of the present invention.
Figure 4:
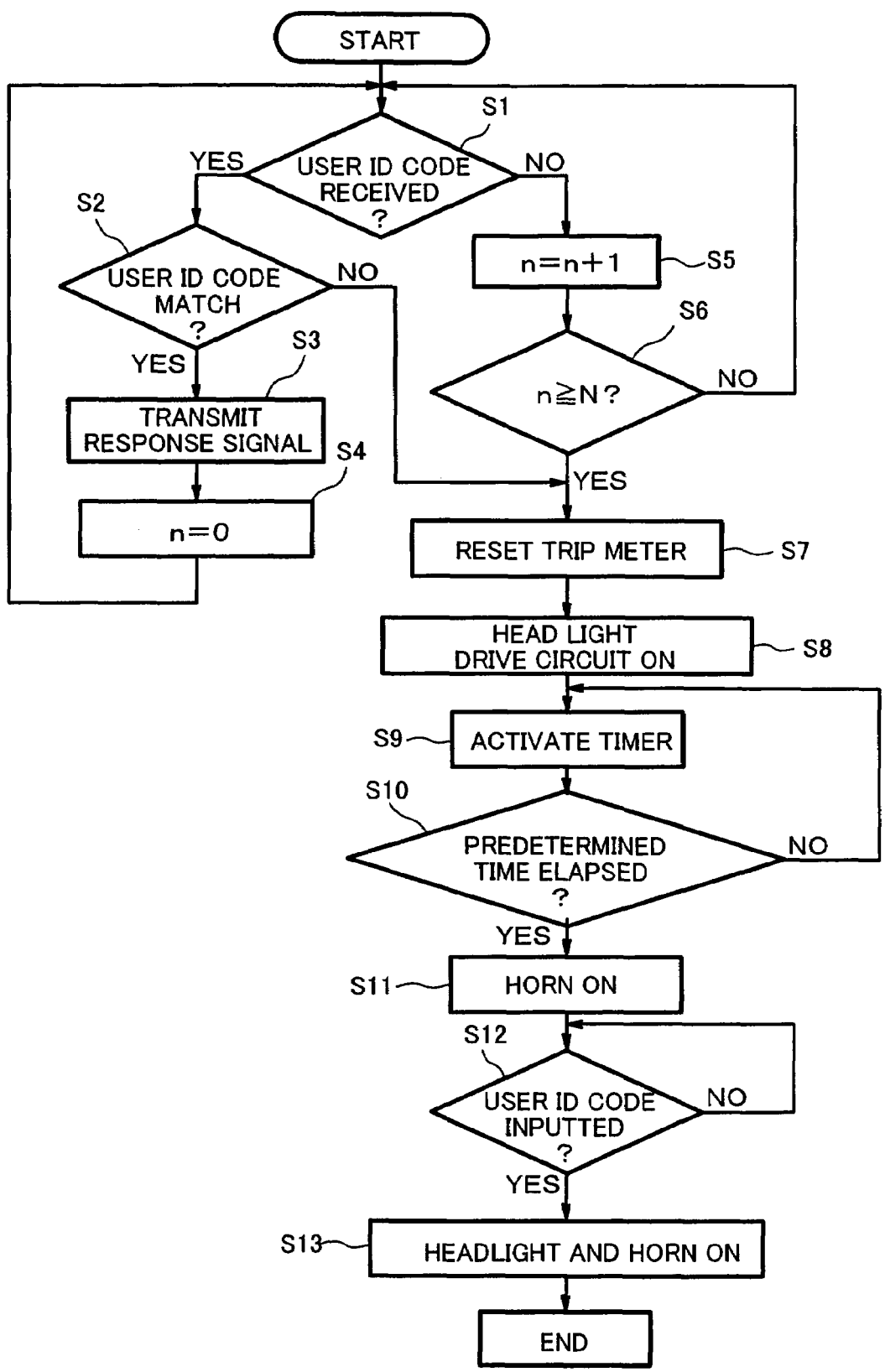
FIG. 4 is a flowchart showing a control process for theft prevention that is executed by a controller of the theft prevention apparatus which is provided in the motorcycle.

When the engine of the motorcycle 1 starts-up, the user ID code is transmitted from the transmitter 2 at the appropriate time intervals (see flowchart of FIG. 3). As shown in a flowchart of FIG. 4, the receiver 11 (see FIG. 1) of the motorcycle 1 receives the user ID code and the controller 12 determines whether or not the receiver 11 has received the user ID code (step S1).

Then, the controller 12 determines whether or not the received user ID code matches the user ID code pre-stored in the memory (step S2), and if these two user ID codes match, the controller 12 transmits a response signal by radio to the transmitter 2 (step S3). Then, the controller 12 resets the number of times "n" the user ID code is not received (step S4).

On the other hand, if it is determined that the receiver 11 does not receive the user ID code within the appropriate time interval, the controller 12 adds one to "n" (step S5). Then, the controller 12 determines whether or not "n" has reached a predetermined number of times "N" (e.g., five) (step S6). If it is determined that "n" is less than "N", the controller 12 returns the process to step S1. On the other hand, if it is determined that "n" has reached "N", the controller 12 drives the reset circuit 16 of the trip meter 15 to reset the trip meter 15 (step S7). In addition, the controller 12 determines that the transmitter 2 (see FIG. 1) has fallen out of the pocket or the like of the rider, and turns ON the head light drive circuit 14 (step S8) to light the head light 13.

While the head light 13 is configured to flash to be distinguishable from normal lighting, it alternatively may be lighted in other suitable manners to enable the rider to distinguish it from the normal lighting, including flashing of direction indicators or emission of sound of a horn. In further alternatives, an alarm light equipped on a meter or other position of the motorcycle 1 may be lighted, or otherwise a warning (alarm) sound emitter equipped on the meter or other position of the motorcycle 1 may be turned ON.

The trip meter 15 may be reset to, rather than "zero", a value obtained by multiplying a time required for counting "n" by the associated travel speed at that point of time (substantially equal to a travel distance from the first detection that the user ID code is not received. Thereby, the trip meter 15 can present a distance from a current point to a vicinity of the point where the transmitter 302 has fallen off. In order to obtain a more precise distance, the reset value may be calculated by integrating speeds by time.

In addition to the step for turning ON the head light drive circuit 14 in step S8, the controller 12 activates a timer (step S9).

The controller 12 determines whether or not a count of the timer has reached a predetermined time (step S1). If it is determined that the count has reached the predetermined time, the controller 12 causes the horn to emit a sound to inform the rider that the count has reached the predetermined time (step S11).

Under this condition, the controller 12 determines whether or not the user ID code has been inputted with another user input device such as an input button provided in the vicinity of the meter or gauge of the motorcycle 1 (step S12). If it is determined that the user ID code has been inputted, the controller 12 turns OFF the head lamp drive circuit 14 and stops operation of the horn (step S13).

Figure 5:
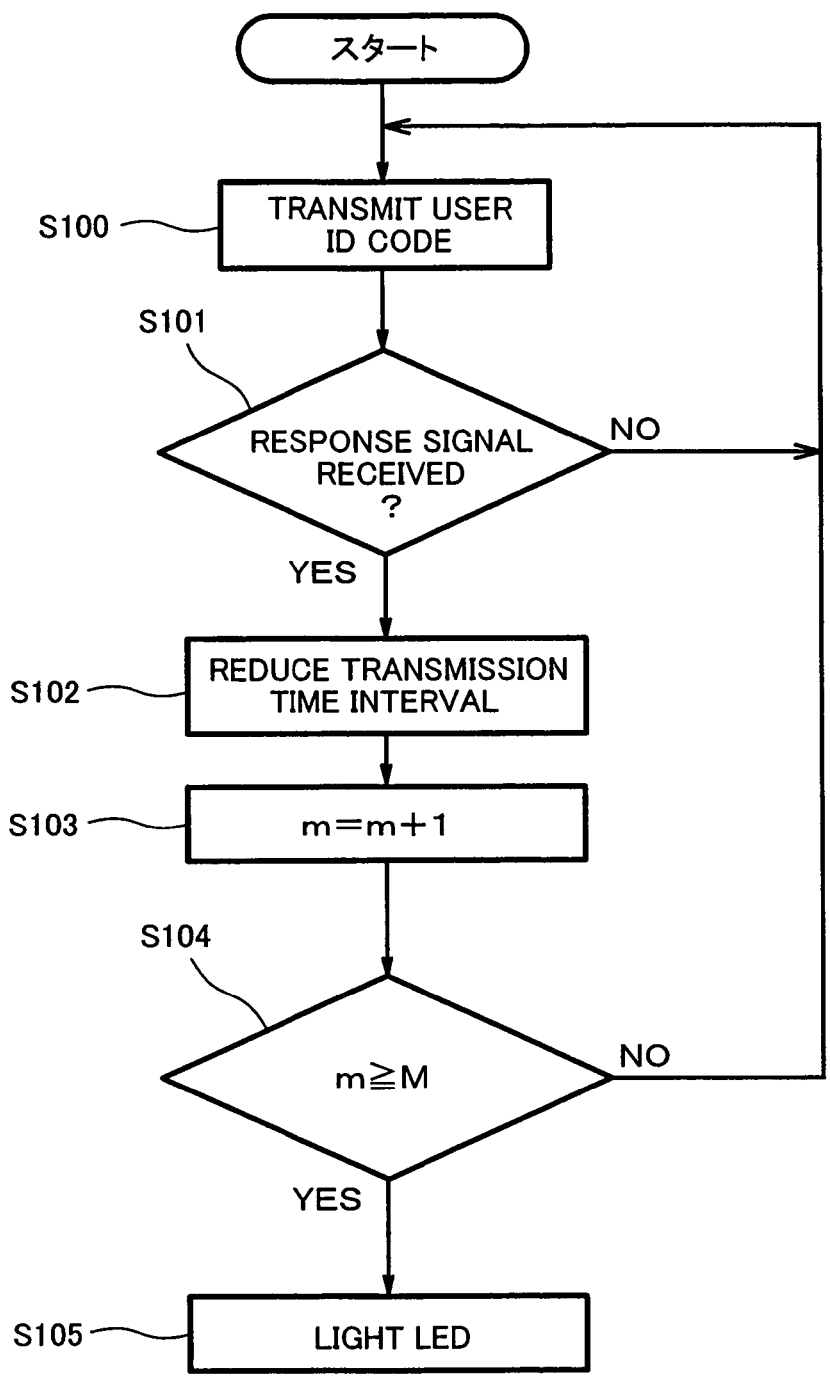
FIG. 5 is a flowchart showing a control process for theft prevention that is executed by the transmitter of the theft prevention apparatus.

Turning to a flowchart of FIG. 5, the transmitter 2 transmits the user ID code at the appropriate time intervals (step S100) as described above, and the control unit 21 determines whether or not the transmitter receiver 23 has received the response signal from the motorcycle 18 side (step S101).

If it is determined that the receiver 23 does not receive the response signal, the control unit 21 reduces transmission time interval from the appropriate time interval (step S102).

The control unit 21 adds one to the number of times "m" at which the receiver 23 does not receive the response signal (step S103).

Then, the control unit 21 determines whether or not "m" has reached predetermined number of times "M" (e.g., five times). If it is determined that "m" is less than "M", the control unit 21 returns the process to step S100. On the other hand, if it is determined that "m" reached "M" the control unit 21 lights the LED 25 (step S105). The LED 25 may desirably be configured to flash to enable the rider to easily recognize this information. Rather than the LED 25, the transmitter 2 may be provided with a buzzer configured to emit a sound.

In accordance with the theft prevention apparatus configured as described above, upon detecting that the receiver 11 of the motorcycle 1 does not receive the user ID code during travel of the motorcycle 1, the controller 12 causes the trip meter 15 to be reset, and the head light 13 to flash or the like to enable the rider to recognize this. In addition, since the LED 25 of the transmitter 2 which has fallen out of the pocket or the like flashes. Thus, the rider is informed of a distance which the rider should travel back. Furthermore, since the transmitter 2 is flashing, or otherwise the buzzer is emitting a sound at the spot where the transmitter 2 has fallen off the rider and has been lost, the rider can easily find the transmitter 2 even during the night.

In the theft prevention apparatus configured as described above, the receiver 11 of the motorcycle 1 does not receive the user ID code from the transmitter 2 if the motorcycle 1 has been stolen, the head light 13 flashes and further the horn emits a sound in a relatively short time after the theft occurs. This makes it possible that a third party (or police officer) in the vicinity recognizes that the motorcycle 1 has been stolen.

The theft prevention apparatus of the present invention is, of course, applicable to vehicles other than motorcycles or personal watercraft (PWC), which are equipped with a driver's seat that is open to the outside. Especially, in the case of personal watercraft, the theft prevention apparatus of this embodiment also serves as a so-called "tether switch" provided against the rider's falling off of the watercraft into the water.

Embodiment 2

A second embodiment of the theft prevention apparatus of the leisure vehicle of the present invention will be described with reference to FIGS. 6 through 15.

Figure 6:
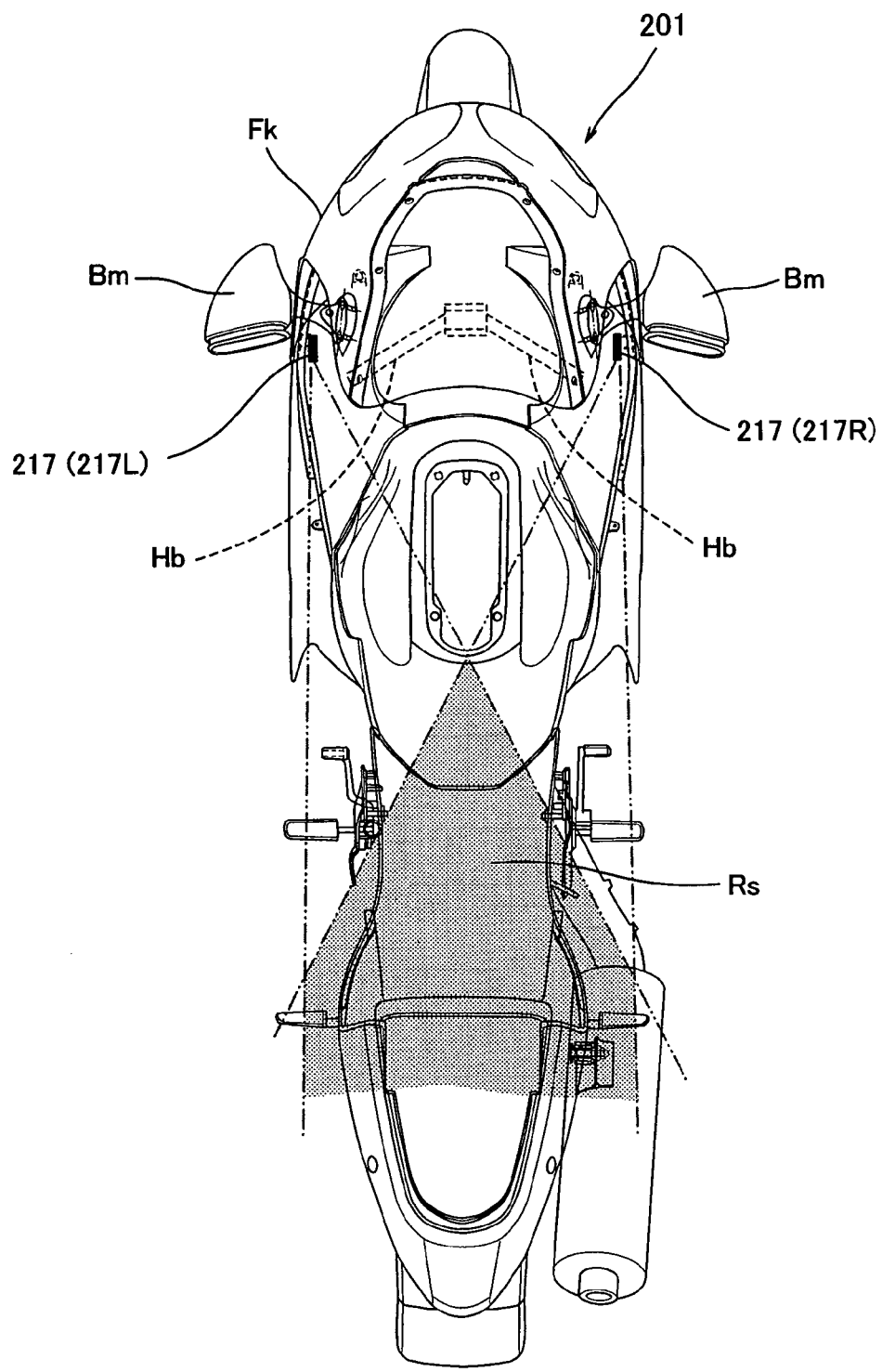
FIG. 6 is a plan view of an entire motorcycle according to a second embodiment of the present invention.
Figure 7:
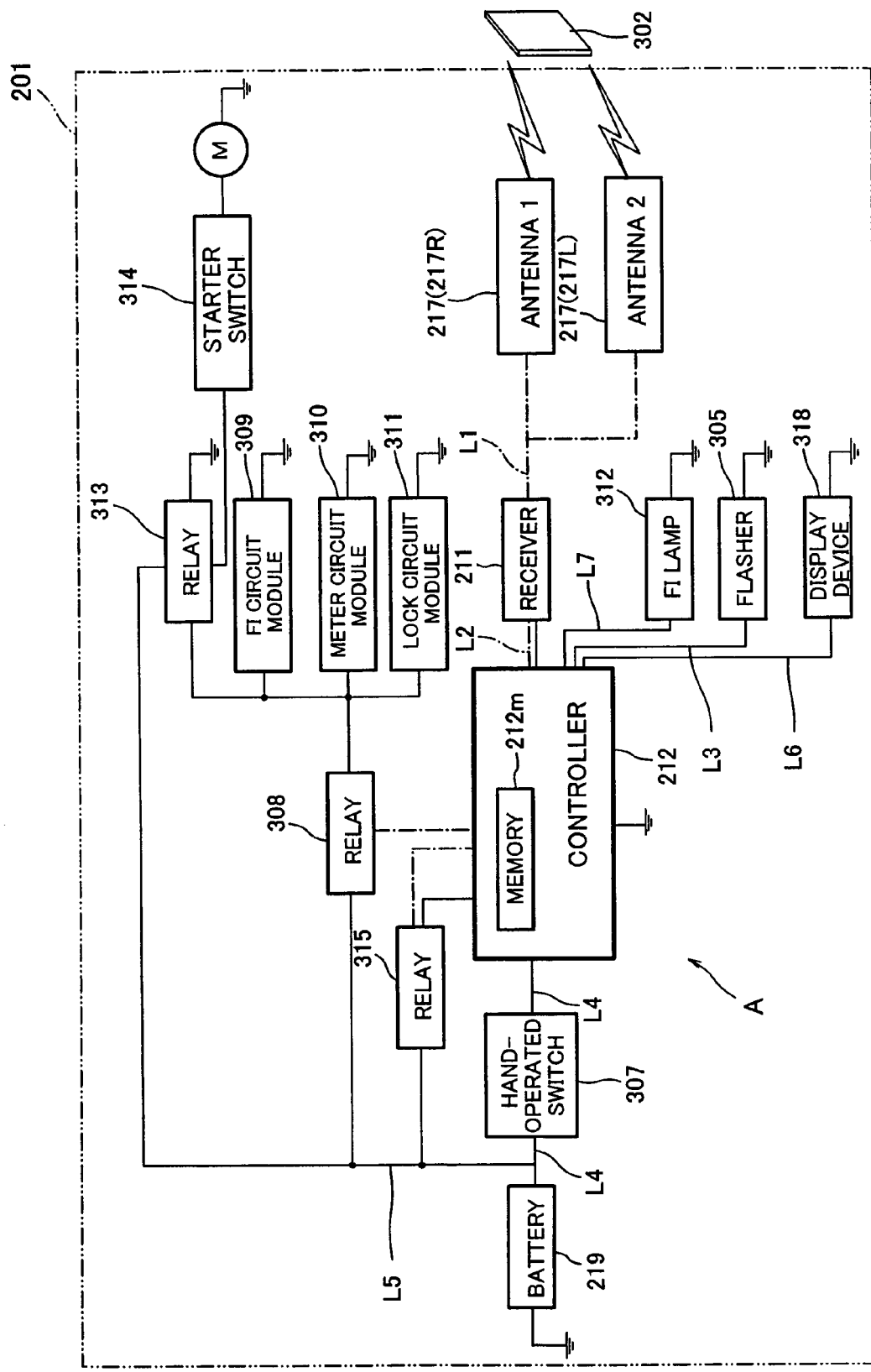
FIG. 7 is a view schematically showing a configuration of main components of the theft prevention apparatus of the motorcycle of FIG. 6.

Turning to FIG. 6, a motorcycle 201 which is one type of leisure vehicle, is equipped with an on-vehicle theft prevention apparatus A shown in FIG. 7, including a receiver (receiver having a vehicle transmitter) 211 of FIG. 7. Directional antennae 217 (217R and 217L: see FIGS. 6 and 7) are mounted to mounting portions of back mirrors Bm on both sides of a front cowling Fk of the motorcycle 201 of FIG. 6.

As shown by a two-dotted line of FIG. 6, the antennae 217R and 217L (see FIGS. 6 and 7) are each capable of receiving a radio wave in an angular range of about 15 to 40 degrees, for example, about 30 degrees in this embodiment. More specifically, as shown in FIG. 6, 25 degrees are made between a center axis of the motorcycle 201 and a specific direction which is rearward of the antenna 217R (217L) and near the center axis of the motorcycle 201, and 30 degrees are made rightward and leftward with respect to the specific direction. In FIG. 6, an overlapping region of the receivable angular ranges of the two antennae 217R and 217L is illustrated as being colored. While the overlapping region of the angular ranges of the respective antennae 217R and 217L covers a rider's seat Rs, it is not intended to be limited to the depicted embodiment, but actually may be about 10 to 60 degrees or larger than 60 degrees.

As shown in FIG. 7, the antennae 217R and 217L are connected to the receiver 211 equipped in the motorcycle 201 through a signal line L1, and the receiver 211 is connected to a controller 212 through a signal line L2. The controller 212 includes a comparator configured to compare two signals received by the receiver 211 through the antennae 217R and 217L to determine whether a difference in intensity between these two signals is zero or less than a predetermined value. If it is determined that the difference in intensity between the two signals is zero or less than the predetermined value, the controller 212 is configured to determine whether or not a received user ID code matches a correct user ID code for certification of the user ID code, which will be described later. On the other hand, if it is determined that the difference in intensity between the two signals is not less than the predetermined value, the controller 212 is configured not to execute a process for certifying the user ID code. It shall be appreciated that the receiver 211 may be provided with the comparator.

The controller 212 contains a memory 212m configured to store the correct user ID code. The controller 212 determines whether or not the user ID code transmitted from a transmitter (transmitter with transmitter receiver) 302 carried in the pocket or the like of the rider to the receiver 211 matches the correct user ID code stored in the memory of the controller 212.

The controller 212 is connected to a flasher 305 of the motorcycle 201 through an electric wire L3, and is configured to answer back by flashing the flasher 305 when the received user ID code matches the correct user ID code. The controller 212 is connected to a FI lamp 312 through an electric wire L7. If it is determined that the two ID codes do not match, the controller 212 causes the FI lamp 312 to flash to inform the rider of "mismatch".

The controller 212 is connected to a battery 219 loaded in the motorcycle 201 through an electric wire L4. A hand-operated switch 307 is provided in the electric wire L4 connecting the controller 212 to the battery 219. Only when the hand-operated switch 307 is being operated to an ON-position, is the power supplied from the battery 219 to the controller 212.

An electric wire L5 is configured to branch from a position of the electric wire L4 between the battery 219 and the hand-operated switch 307 and is connected, through a relay 308, to an FI (fuel and injection system) 309, a meter circuit module (meter system) 310, a lock circuit module (lock system) 311, and a relay 313 through which power is supplied to a starter circuit to drive a starter motor M.

The relay 308 is turned ON and OFF in accordance with an electric signal from the controller 212 and is configured to supply power from the battery 219 to the FI circuit module 309, the meter circuit module 310, the lock circuit module 311, and the relay 313. More specifically, upon the relay 308 being turned to an ON-state, the power is supplied from the battery 219 to the FI circuit module 309, and the meter circuit module 310 to cause these circuits to be turned ON. In addition, the lock circuit module 311 becomes active to unlock a steering lock or a locking device configured to hold a helmet. Further, the relay 313 is turned to an ON-state and the starter circuit is turned ON. Under this condition, the engine of the motorcycle 201 is ready to start-up and the motorcycle 201 becomes steerable.

The electric wire L5 branches and is connected to the controller 212 through the relay 315 to allow the power to be supplied to the controller 212 through the relay 315 after the operation of the hand-operated switch 307 terminates to cause the hand-operated switch 307 to turn to an OFF-position. The relay 315 and the controller 212 have a self maintenance function to supply the power to the controller 212.

The electric wire L5 further branches and is configured to connect, through the relay 313, a starter switch 314, a starter motor M provided downstream of the starter switch 314, and the battery 219.

The hand-operated switch 307 may be a kill switch including a slidable switch which is disposed in the vicinity of a right grip of a handle bar Hb of the motorcycle shown in FIG. 6. It would be desirable to use a position added to the kill switch configured to stop the engine, since the number of components will not increase. If the rider operates the hand-operated switch 307 with a thumb to cause a slidable lever (movable element) 307a to move counterclockwise from a home position as indicated by a solid line in FIG. 13B to a position as indicated by a solid line in FIG. 13A (corresponding to a two-dotted line in FIG. 13B) against a spring force for keeping the state indicated by the solid line of FIG. 13B, the power can be supplied to the controller 211 and the receiver 211 while the rider is operating the switch 30 with the thumb. As soon as the thumb stops operating the slidable lever 307a, the slidable lever 307a returns to the home position by the spring force. The kill switch may be replaced by an existing lap time start/stop switch provided in the vicinity of a right end of the handle bar.

Figure 13A:
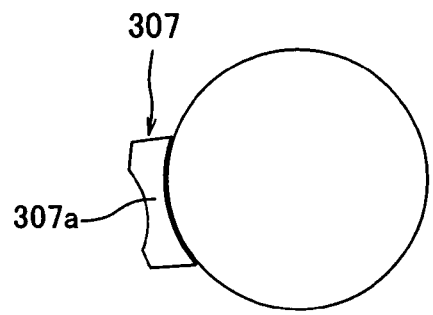
FIGS. 13A-13C are views schematically showing a construction of a hand-operated switch forming a part of the theft prevention apparatus of FIGS. 6 and 7.
Figure 13B:
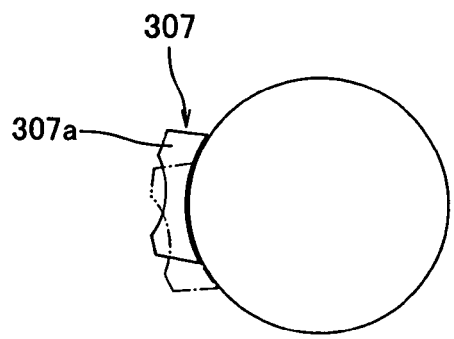
Figure 13C:
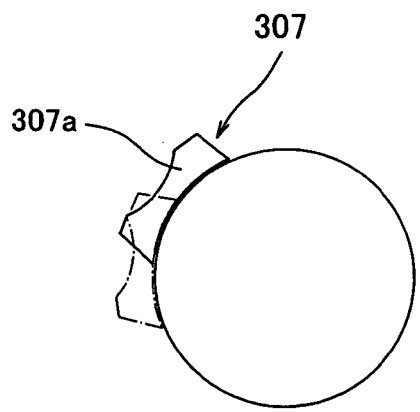
Figure 14:
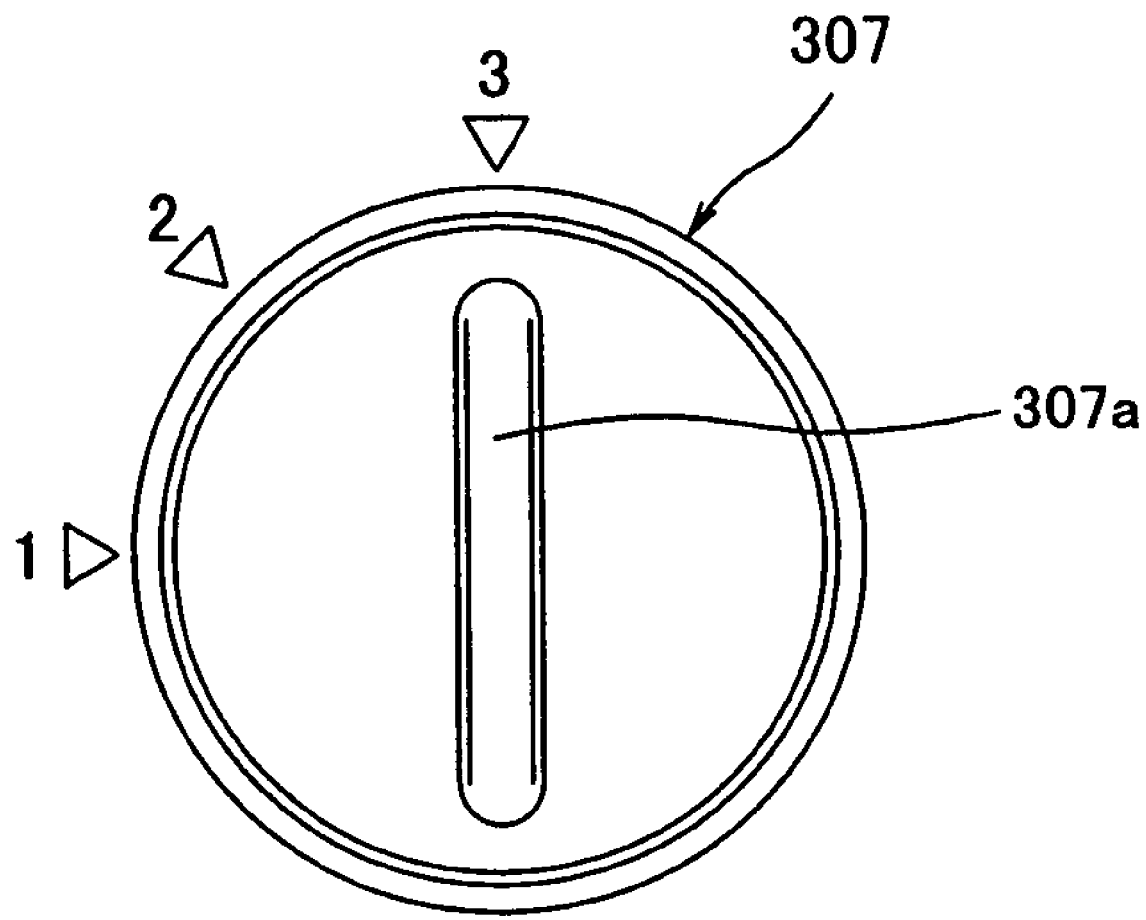
FIG. 14 is a view schematically showing a construction of a hand-operated switch (dial switch) according to another embodiment.
Figure 15:
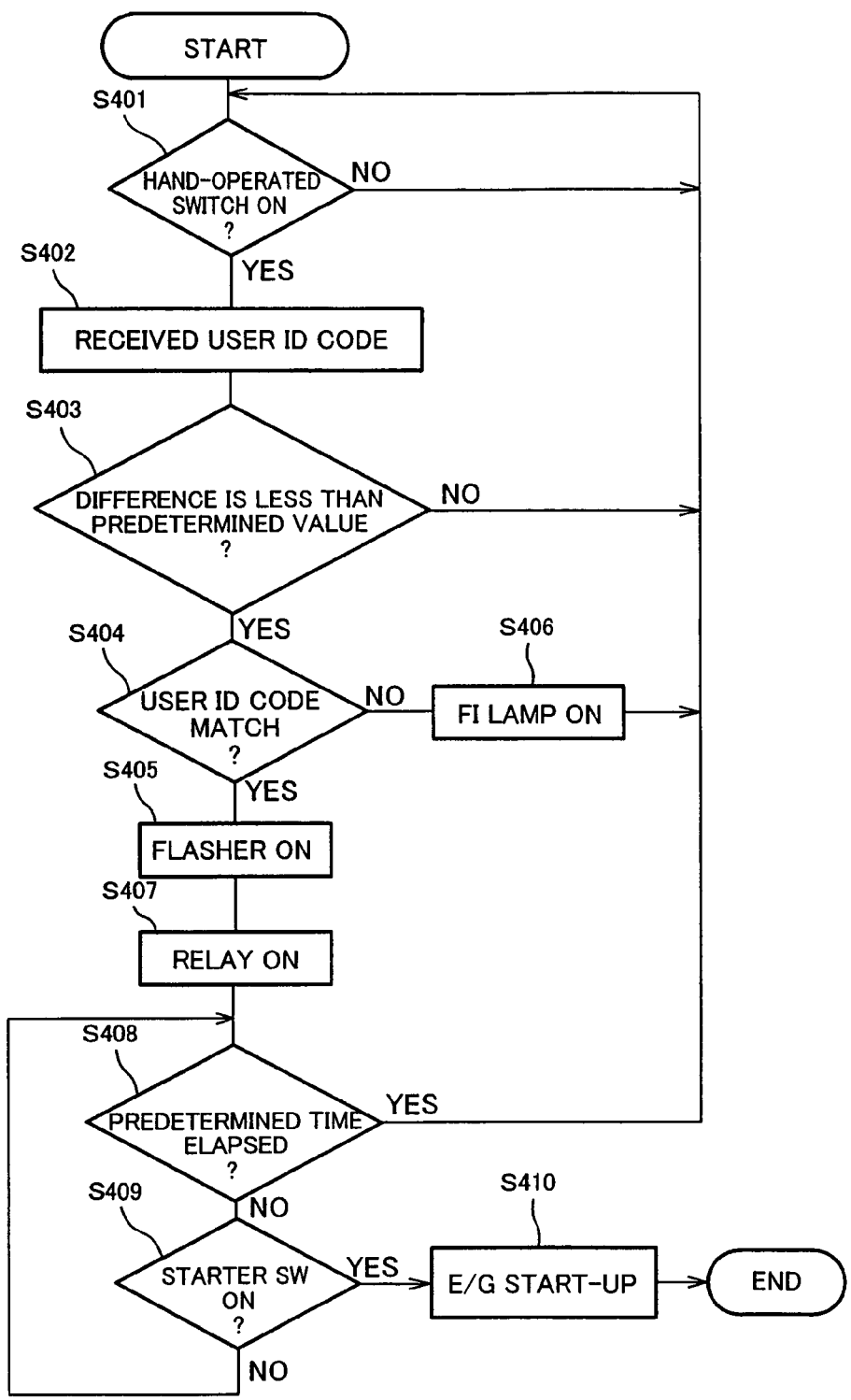
FIG. 15 is a flowchart showing a control process of a theft prevention apparatus according to the second embodiment.

The kill switch, which is the hand-operated switch 307, may be configured to be operated by the thumb of the rider to cause the slidable lever 307a to slide from the home position indicated by the solid line in FIG. 13B to a position indicated by a solid line in FIG. 13C, thereby turning the kill switch to an ON-position to stop the engine. As a result, the running engine stops, or otherwise, the engine in a stopped state is prevented from start-up. In addition, the kill switch may be configured to be operated by the thumb of the rider to cause the slidable lever 307a to slide from the position indicated by the solid line in FIG. 13C to the home position indicated by the solid line in FIG. 13B, thereby returning the kill switch to an OFF-position. With the slidable lever 307a in the position indicated by the solid line in FIG. 13B, the engine in the stopped state can start-up.

The slidable lever 307a has a detent function to keep the positions indicated by the solid lines of FIGS. 13B and 13C, unless it is intentionally moved to another position by the thumb or the like of the rider.

In the motorcycle 201 of the second embodiment, even when the slidable lever 307a of the kill switch which is the hand-operated switch 307 is moved to an ON-position indicated by the solid line in FIG. 13C to stop the running engine, the engine can re-start up by returning the slidable lever 307a to the home position indicated by the solid line in FIG. 13B within a predetermined time, for example 10 minutes required for fueling. In this case, however, the theft prevention apparatus is functioning, and therefore, the engine cannot re-start up unless the user ID code has been certified.

In the second embodiment, as shown in FIG. 7, the controller 212 is connected through an electric wire L6 to a display device 318 installed on a meter panel. If the battery of the transmitter 302 of the theft prevention apparatus is running short of power, this information is transmitted from the transmitter 302 to the receiver 211. The receiver 211 (or the controller 212) causes the display device 318 to display information indicating that the battery of the transmitter 302 is running short of power, to be presented to the rider. According to this information, the rider replaces the battery of the transmitter 302.

As an alternative to the hand-operated switch 307, a dial switch 307 may be independently provided, including a movable portion 307a capable of being set in a position selected from plural positions (e.g., three positions in the second embodiment in FIG. 14), or otherwise, a switch having another configuration may be provided, although not shown. In FIG. 7, a one-dotted line connecting the blocks indicates signal lines and solid lines indicate electric wires.

The theft prevention apparatus configured as described above functions as described below. A control process executed by the controller 212 and the associated theft prevention function will be described with reference to the flowchart of FIG. 15.

Assume that the rider rides on the rider's seat Rs of the motorcycle 201 and operates the hand-operated switch 307 with the transmitter 302 put in the pocket or the like (step S401). Upon this operation, the user ID code transmitted from the transmitter 302 is received by the antennae 217 (217R and 217L) (step S402). The received user ID code is transmitted to the controller 212 through the receiver 211. The controller 212 compares intensity between the received signals from the antenna 217R and 217L (step S403). When the rider is riding on the rider's seat Rs as described above, the difference in the intensity is zero or less than the predetermined value. If it is determined that the difference in the intensity is less than the predetermined value, the controller 212 determines whether or not the received user ID code matches the correct user ID code stored in the memory 22m (step S404). On the other hand, if it is determined that the difference is not less than the predetermined value, the controller 212 returns the process to step S401.

If it is determined that the two user ID codes match in step S404, the controller 212 flashes the flasher 305 of the motorcycle 201 to inform the rider of the match between the two ID codes (step S405), and advances the process to step S407. On the other hand, if it is determined that the two user ID codes do not match, the controller 212 flashes the FI lamp 312 to inform the rider of the mismatch (step S406).

When the two user ID codes match, the controller 212 turns ON the relay 308 to turn each of the FI circuit module 309 and the meter circuit module 310 to an ON-state (active state), and turns ON the relay 313 (step. S407). In addition, the controller 212 turns the lock circuit module 311 to an ON-state (active state) to unlock the steering lock or the holding device of the helmet. Further, the controller 212 turns ON the relay 315 to enable the power to continue to be supplied to the controller 212. Then, the controller 212 activates a timer configured by software (program) (step S408). If the rider turns the starter switch 314 of the engine to an ON-position within a predetermined time, for example, five minutes (step S409), the starter motor M rotates while the starter switch 314 is in the ON-position, causing the engine to start-up (step S410). So, the control process for the theft prevention terminates. On the other hand, if the predetermined time (e.g., five minutes) has elapsed with the starter switch 314 unoperated, the controller 212 returns the process to an initial state (START in FIG. 5). In other words, after an elapse of the predetermined time, the engine cannot start-up unless the steps for certifying the user ID code have been accomplished.

Figure 8:
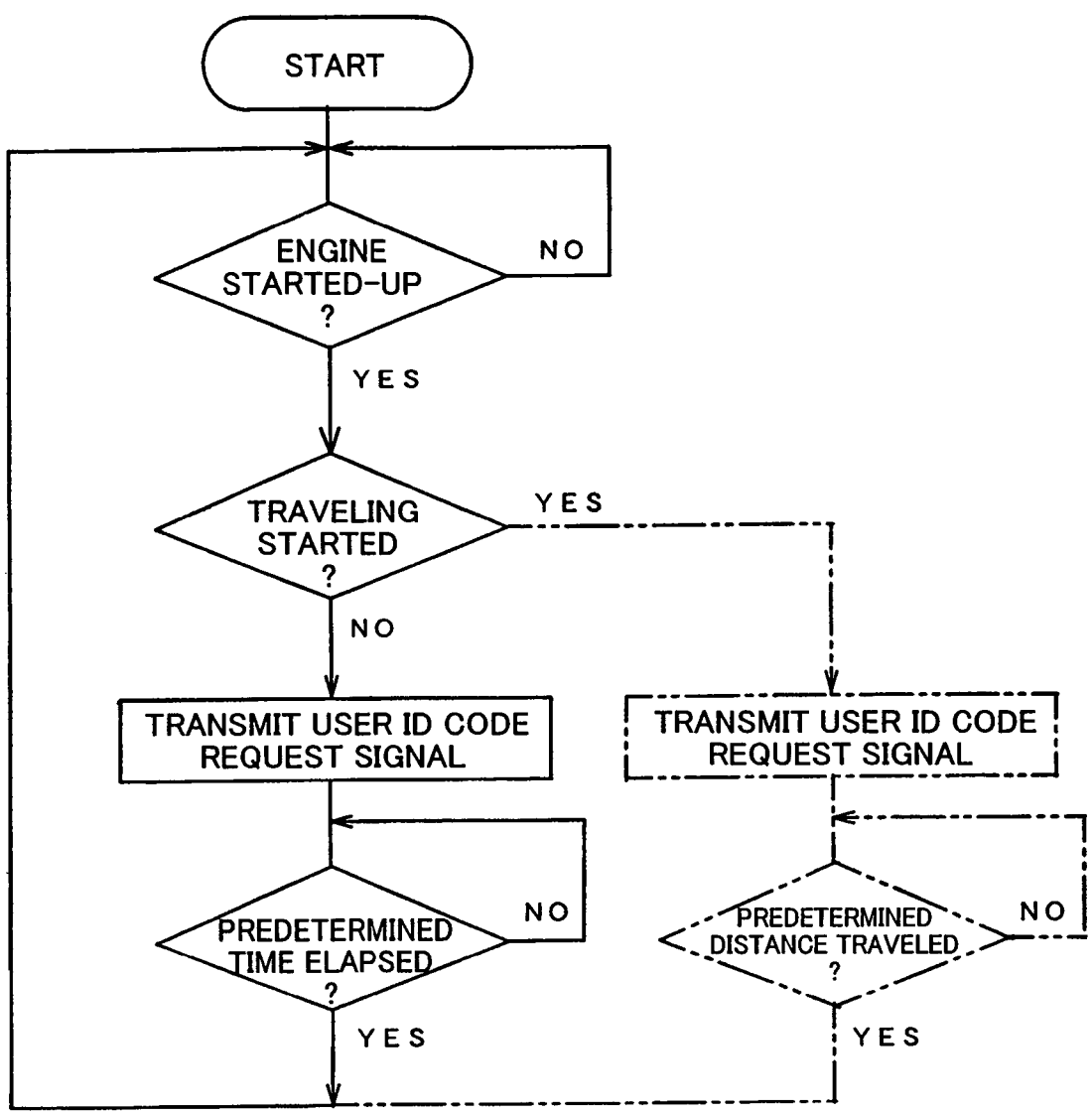
FIG. 8 is a flowchart showing a control process for detecting a loss of the transmitter of the theft prevention apparatus provided in the motorcycle of FIG. 6.
Figure 9:
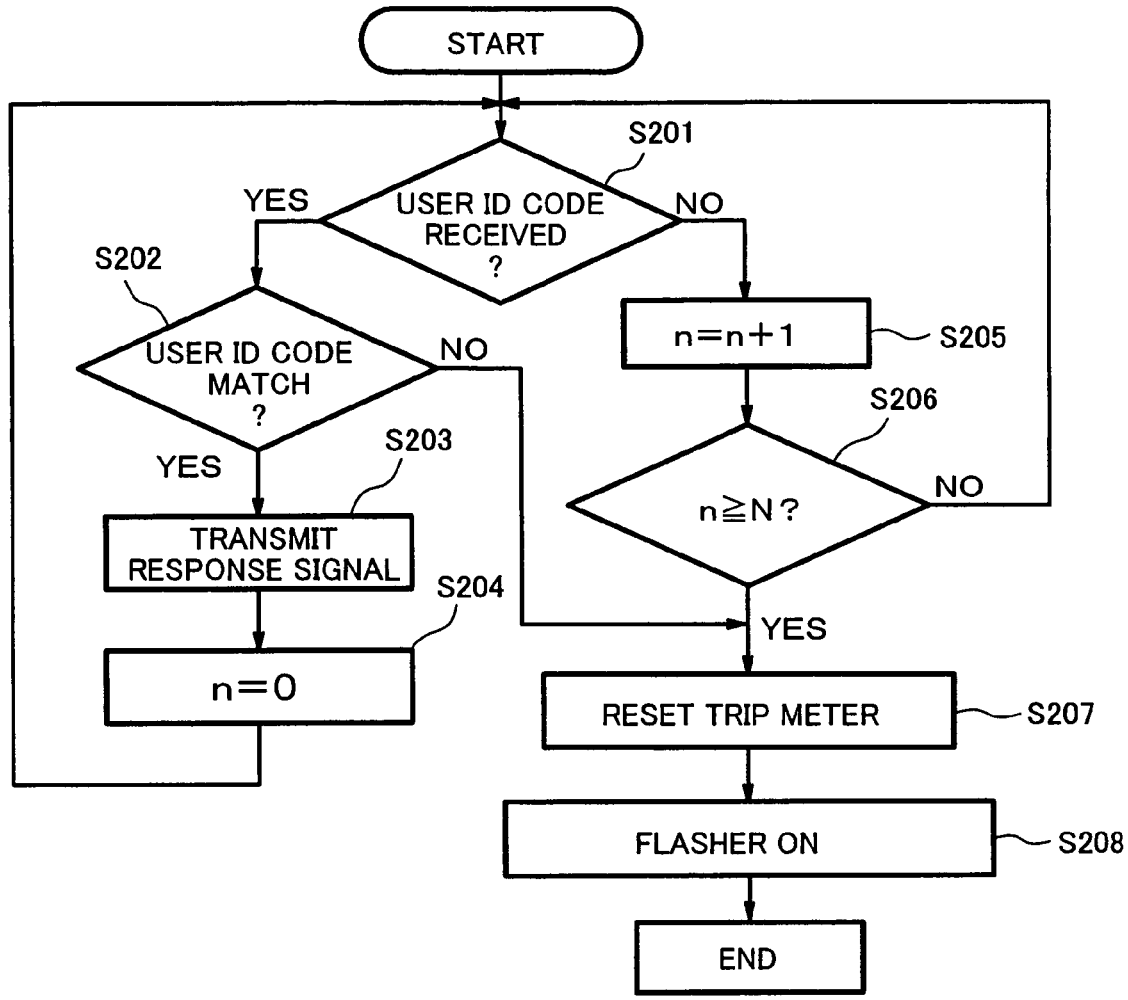
FIG. 9 is a flowchart showing a control process for detecting the loss of the transmitter of the theft prevention apparatus provided in the motorcycle of FIG. 6.

Upon the start-up of the engine of the motorcycle 201, the controller 212 determines whether or not the engine has started-up as indicated by a solid line of a flowchart in FIG. 8. If it is determined that the engine has started-up, the receiver 211 transmits a user ID code transmission request signal to the transmitter 302 at appropriate time intervals.

Receiving the user ID code transmission request signal, the transmitter 302 transmits the user ID code by radio.

The transmitted user ID code is received by the receiver 211 (see FIG. 7) of the motorcycle 201. Turning to a flowchart of FIG. 9, the controller 212 determines whether or not the receiver 211 has received the user ID code (step S201). Then, the controller 212 determines whether or not the received user ID code matches the user ID code stored in the memory contained therein (step S202). If it is determined that the two user ID codes match, the controller 212 transmits a response signal by radio to the transmitter 302 (step S203). Then, the controller 212 resets the number of times "n" the user ID code is not received to zero (n=0) (step S204).

On the other hand, if it is determined that the receiver 211 does not receive the user ID code within a predetermined time after transmitting the user ID code transmission request signal in step S201, the controller 212 adds one to "n" (step S205). Then, the controller 212 determines whether or not "n" has reached a predetermined number of times "N" (e.g., five times) (step S206). If it is determined that "n" is less than "N", the controller 212 returns the process to step S201. On the other hand, if it is determined that "n" has reached "N", the controller 212 drives the reset circuit of the trip meter within the meter circuit module 310 to reset the trip meter (step S207). In addition, the controller 212 further determines that the transmitter 302 has fallen out of the pocket or the like of the rider, and turns ON the flasher 305 (step S208) to flash the flasher 305. The flasher 305 is not intended to be limiting, rather it will be appreciated that other suitable alarm indicators, including the head light, the horn, etc., may be employed. In further alternatives, the alarm indicator may be an alarm light mounted to the meter or other position of the motorcycle 201, or an alarm sound emitter mounted to other position of the motorcycle 201.

Figure 10:
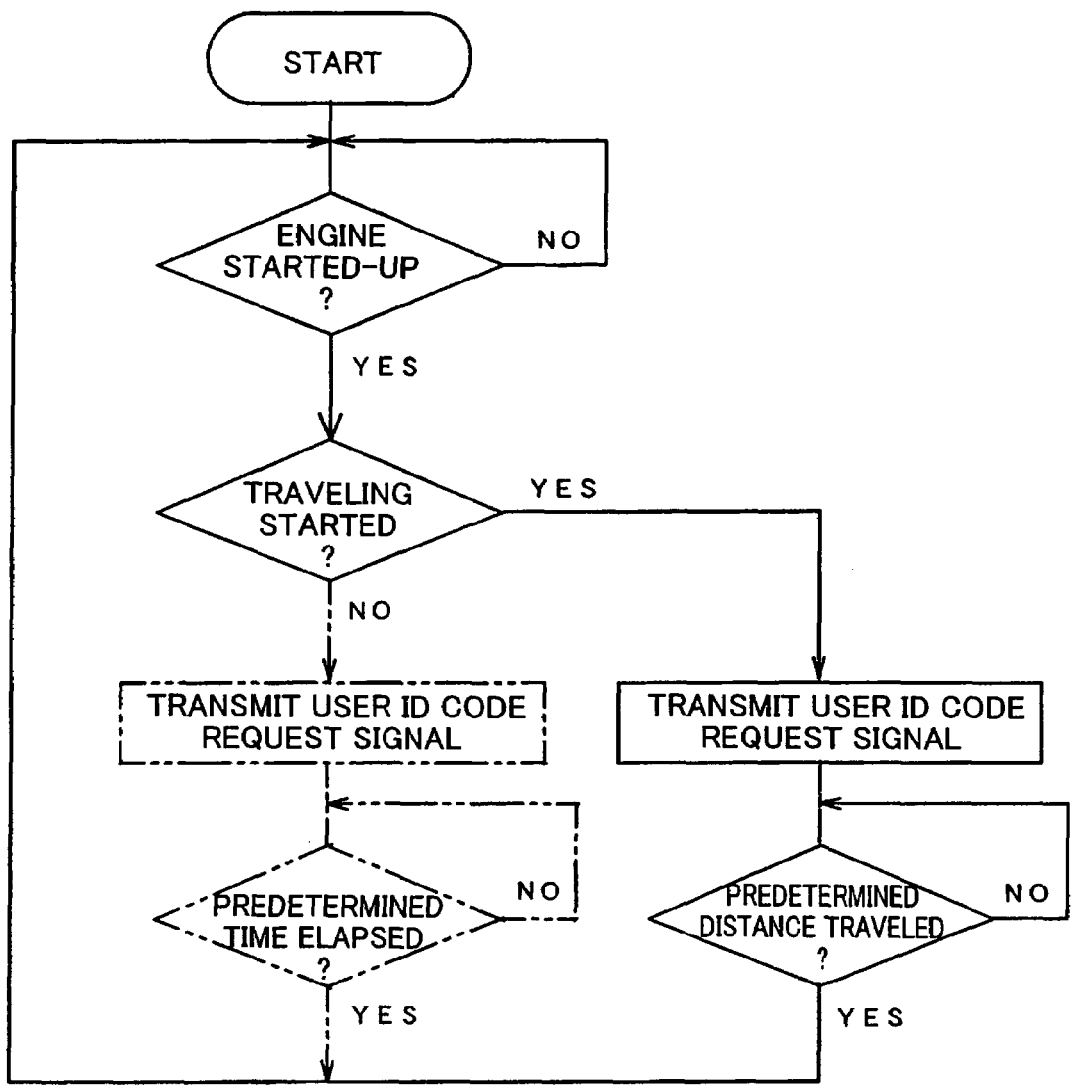
FIG. 10 is a flowchart showing a control process for detecting the loss of the transmitter of the theft prevention apparatus provided in the motorcycle of FIG. 6.
Figure 11:
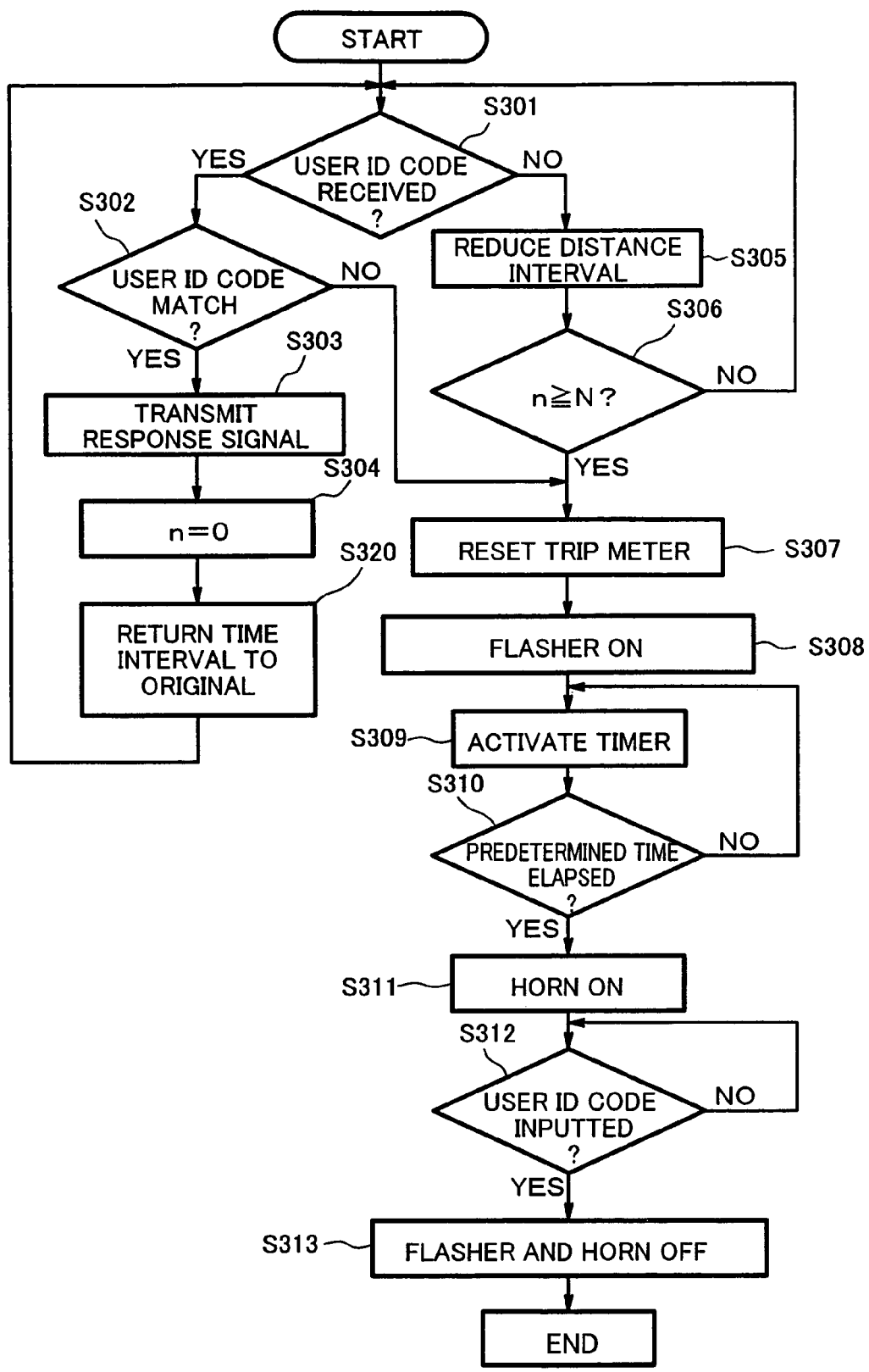
FIG. 11 is a flowchart showing a control process for detecting the loss of the transmitter of the theft prevention apparatus provided in the motorcycle of FIG. 6.

Turning to a flowchart indicated by a solid line of FIG. 10, upon the motorcycle 201 starting traveling, the controller 212 determines whether or not the motorcycle 201 has started traveling. If it is determined that the motorcycle 201 has started traveling, the receiver 211 transmits a user ID code transmission request signal to the transmitter 302 at appropriate distance intervals, for example, every 500 meters.

Receiving the user ID code request signal, the transmitter 302 transmits the user ID code by radio. The controller 212 determines whether or not the engine has started-up based on detected data from an engine tachometer or the like, and determines whether or not the motorcycle 201 has started traveling, based on detected data from a speedometer or the like. It will be appreciated that global positioning system (GPS) may be also employed to detect that the motorcycle 201 has started traveling.

The user ID code transmitted from the transmitter 302 is received by the receiver 211 (see FIG. 7) of the motorcycle 201. Turning to a flowchart of FIG. 11, the controller 212 determines whether or not the receiver 211 has received the user ID code (step S301). Then, the controller 212 determines whether or not the received user ID code matches the user ID code stored in the memory (step S302). If it is determined that these two codes match, the controller 211 transmits a response signal by radio to the transmitter 302 (step S303). Then, the controller 211 resets "n" to zero (step S304), and resets a transmission timing of the user ID code to an initial (normal) timing (step S320).

If it is determined that the receiver 211 does not receive the user ID code after an elapse of time from when the receiver 211 has transmitted the user ID code transmission request signal in step S301, the controller 212 adds one to "n" and reduces the appropriate distance interval by a predetermined value, for example, 50%, or otherwise according to a traveling speed at that point of time (step S305). Then, the controller 212 determines whether or not "n" has reached "N" (step S306).

If it is determined that "n" is less than "N" in step S306, the controller 212 returns the process to step S301. On the other hand, if it is determined that "n" has reached "N", the controller 212 drives the trip meter reset circuit of the meter circuit module 310 to reset the trip meter (step S307). In addition, the controller 212 determines that the transmitter 302 (see FIG. 7) has fallen out of the pocket or the like, and turns ON the flasher 305 which is the alarm indicator of the second embodiment, to light the flasher 305. The alarm indicator may be other suitable devices as described previously. Instead of the trip meter, a time counting device, for example, a timer may be configured to specify an elapse of time after the transmitter 302 has been lost.

The trip meter 15 of the meter circuit module 310 may be reset to, rather than "zero", a value obtained by multiplying a time required for counting "n" by the associated traveling speed at that point of time (substantially equal to a traveling distance from the first detection that the user ID code is not received). Thereby, the trip meter can accurately present a distance from a current point to a vicinity of the point where the transmitter 302 has been lost. In order to obtain a more accurate distance, the reset value may be calculated by integrating speeds by time.

In addition to the step for flashing the flasher 305 in the step S308, the controller 12 activates a timer (step S9).

The controller 12 determines whether or not a count of the timer meets or exceeds a predetermined time (step S310). If it is determined that the count meets or exceeds the predetermined time, the controller 212 causes the horn to emit a sound to inform the rider of this (step S311).

Under this condition, the controller 212 determines whether or not the user ID code has been inputted with another user input device such as an input button provided in the vicinity of the meter of the motorcycle 1 (step S312). If it is determined that the user ID code has been inputted with the user input device, the controller 212 turns OFF the flasher 305 and stops activation of the horn (step S313).

Figure 12:
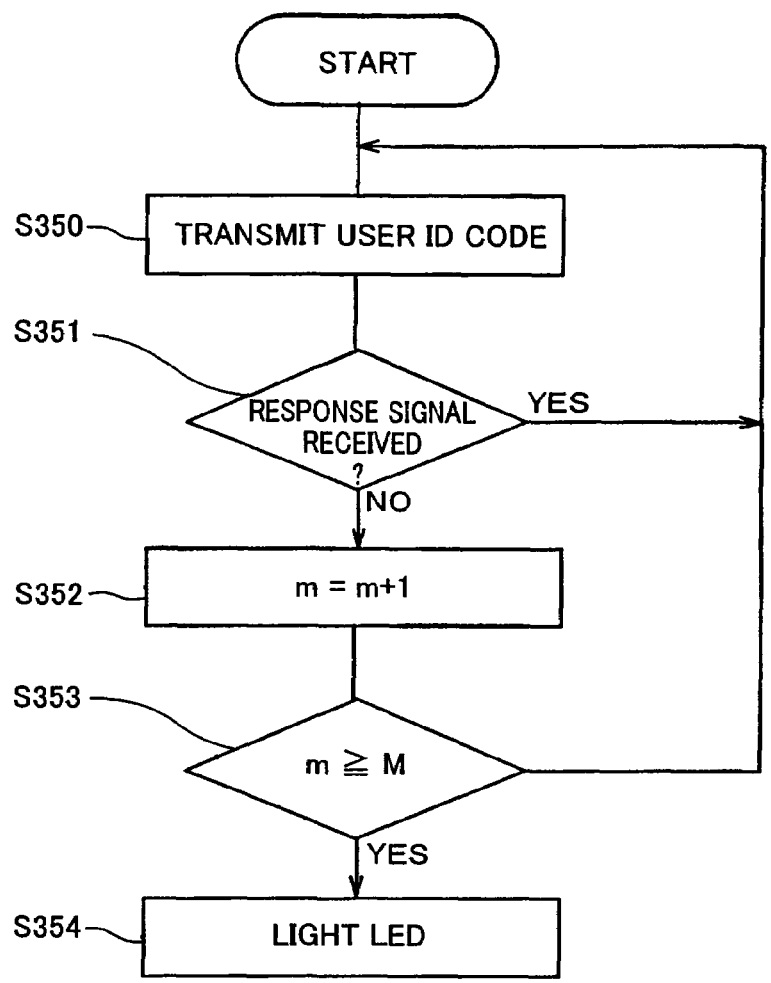
FIG. 12 is a flowchart showing a control process for detecting the loss of the transmitter of the theft prevention apparatus provided in the motorcycle of FIG. 6.

Turning to a flowchart of FIG. 12, the transmitter 302 transmits the user ID code in response to the user ID code transmission request signal (step S350), and a control (not shown) unit of the transmitter 302 determines whether or not the transmitter 302 has received the response signal from the vehicle receiver 211 within a predetermined time (step S351).

If it is determined that the transmitter 302 does not receive the response signal in step S351, the control unit of the transmitter 302 adds one to "m" (step S352).

Then, the control unit of the transmitter 302 determines whether or not "m" has reached a predetermined number of times M (e.g., five times) (step S353). If it is determined that "m" is less than "M", the control unit returns the control process to step S350. On the other hand, if it is determined that "m" has reached "M", the control unit executes control to light the LED of the transmitter 302 (step S354). The LED may desirably be flashed so as to be easily identified by the rider. Rather than the LED, the transmitter 302 may be provided with a buzzer configured to emit a sound.

In accordance with the theft prevention apparatus configured as described in the second embodiment, upon detecting that the receiver 211 of the motorcycle 201 does not receive the user ID code during travel of the vehicle, the trip meter is reset and the flasher 305 flashes to enable the rider to recognize this information. In addition, the LED of the transmitter 302 which has fallen out of the pocket or the like of the rider is flashing. So, the rider is informed of a distance which the rider should travel back. Furthermore, since the transmitter 302 is flashing, or otherwise the buzzer is emitting a sound at the spot where the transmitter 302 has fallen and has been lost, the rider can easily find the transmitter 302 even during night. As a matter of course, the effects of the first embodiment are also obtained.

In the motorcycle 201 of the second embodiment, if the slidable lever 307a of the kill switch, which is the hand-operated switch 307, is moved to the position indicated by the solid line of FIG. 13C, the relay 308 is turned OFF, and the engine stops.

In accordance with the motorcycle 201 of the second embodiment, when the engine stops for fueling or the like, the controller 212 turns ON the relay 308 and the relay 315 for a predetermined time required for fueling or the like, for example, 10 minutes, and maintains this state. For the predetermined time, the process for certifying the user ID code between the transmitter 302 and the controller 212 via the receiver 211 is carried out repeatedly at appropriate time intervals. If the rider is riding on the rider's seat Rs, the process transitions from step S403 to step S404 in the flowchart of FIG. 15, and thereby the engine can start-up. On the other hand, if the rider is not riding on the rider's seat Rs, the process transitions from step S403 to step S401 rather than step S404. In this case, since the user ID code is not certified, the theft prevention function is active. As a result, the motorcycle 201 will not be stolen while the rider is going to somewhere else.

Even when the engine is stopped with the kill switch, it can be re-started up by the user's operating the starter switch 314 within the predetermined time so long as the rider is riding on the rider's seat with the transmitter 302 put in the pocket or the like.

In accordance with the theft prevention apparatus of the motorcycle 201 of the second embodiment, the power is not substantially consumed on the motorcycle 201 side before the hand-operated switch 307 is operated. As a result, wasteful power consumption is inhibited. In addition, the process for certifying the user ID code is carried out only when the rider is positioned in a predetermined location, for example, the rider's seat Rs, whereas the process for certifying user ID code is not executed when the rider is positioned in a different location, for example, laterally of the motorcycle 201. Thus, theft prevention function is enhanced.

The engine control unit (ECU) of the motorcycle 201, or otherwise, another controller may function as the controller 212 of the second embodiment. Nonetheless, the ECU is desirably employed as the controller 212, without an increase in the number of components and an increase in a manufacturing cost.

Embodiment 3

A theft prevention apparatus of a leisure vehicle according to a third embodiment will be described with reference to FIGS. 16 through 18.

Figure 16:
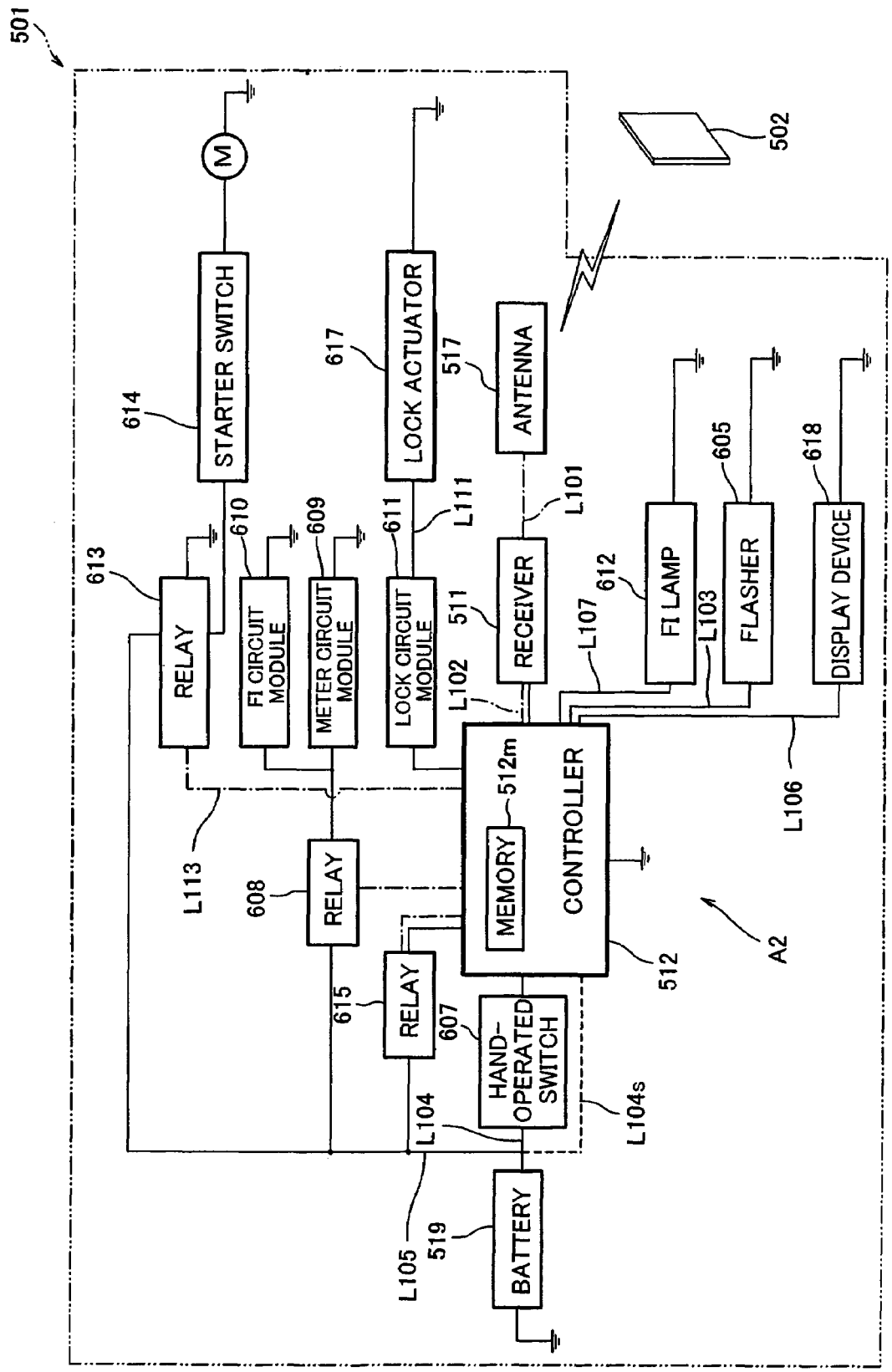
FIG. 16 is a view schematically showing a configuration of main components of a theft prevention apparatus of a motorcycle according to a third embodiment.
Figure 17:
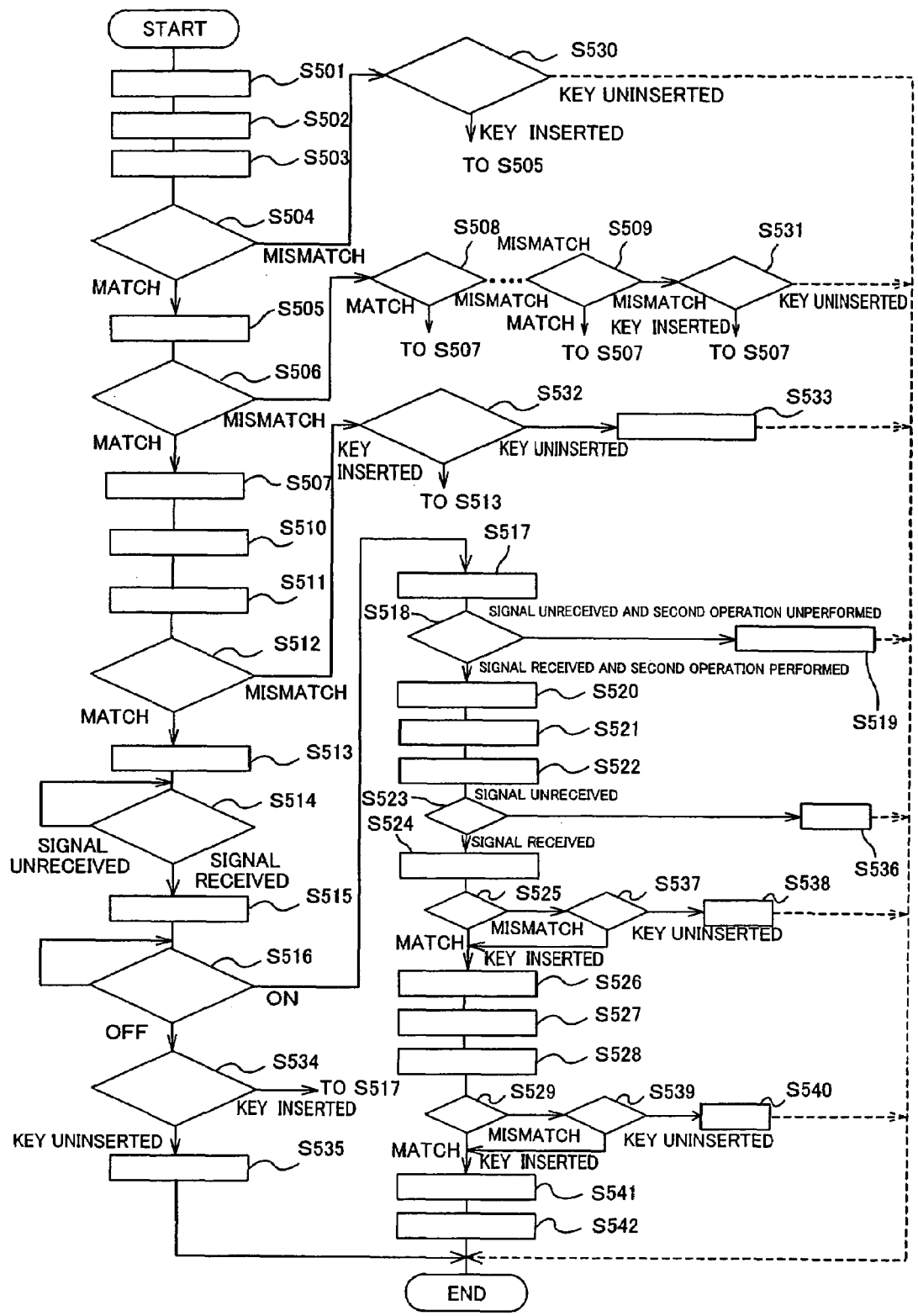
FIG. 17 is a flowchart showing a control process of the theft prevention apparatus of FIG. 16.

Turning to FIG. 16, an on-vehicle theft prevention apparatus A2 is mounted in a motorcycle 501 (see FIG. 18), including a receiver 511. The on-vehicle theft prevention apparatus A2 has an antenna 517 for transmission and reception, which is provided in a position of the motorcycle 501, for example, under the rider's seat Rs.

The antenna 517 is configured to receive a signal from all directions and to transmit a signal to all directions. The antenna 517 is, as shown in FIG. 16, connected, through a signal line L101, to the receiver 511, which is in turn connected to a controller 512 through a signal line L102.

The controller 512 includes a built-in memory 512m configured to store a correct user ID code. The controller 512 determines whether or not a user ID code transmitted from a portable transmitter 502 being carried in the pocket or the like of the rider and received by the receiver 511 matches the correct user ID code stored in the memory 512m.

The controller 512 is connected to a flasher 605 of the motorcycle 201 through an electric wire L103. If it is determined that the user ID code transmitted from a portable transmitter 502 matches the correct user ID code, the controller 512 answerbacks by flashing the flasher 605.

The controller 512 is connected to an FI lamp 612 through an electric wire L107, and is configured to selectively flash the FI lamp 612 if the two ID codes do not match, to inform the rider of the mismatch between the two codes.

The controller 512 is connected to a lock circuit module (lock system) 611 and a lock actuator 617 through an electric wire L111. A control operation of the controller 512 and an operation control of the lock circuit module 611 enable power to be supplied to the lock actuator 617, which thereby is activated. The lock actuator 617 is not intended to be limited to a lock actuator configured to lock and unlock a steering lock, but may be a lock actuator configured to lock and unlock a helmet lock or a seat lock, a lock actuator configured to lock and unlock a fuel cap, or otherwise an actuator configured to lock and unlock a saddle bag.

The controller 512 is connected to a battery 519 loaded in the motorcycle 501 through an electric wire L104. A hand-operated switch 607 is provided in a position of the electric wire L104. The controller 512 is configured to turn ON a relay 615 and a relay 608, upon the hand-operated switch 607 being turned to an ON-position.

In the third embodiment, the controller 512 is directly connected to the battery 519 side through an electric wire L104s indicated by a broken line, and is configured to be supplied with a minute current (minute power) from the battery 519 before the hand-operated switch 607 is turned to an ON-position. The supplied minute current enables the controller 512 to move to and keep a "sleep mode" (standby state).

Upon the hand-operated switch 607 being operated, the relay 615 is turned ON. Thereby, an electric wire L105 which branches from a position between the hand-operated switch 607 and the battery 519 is connected to the controller 512 through the relay 615, thereby allowing the power to be supplied from the battery 519 to the controller 512. Thereby, with the hand-operated switch 607 being in an OFF-position after the operation of the hand-operated switch 607 terminates, the power is supplied to the controller 512. That is, the relay 615 and the controller 512 have a self maintenance function to supply the power to the controller 512.

More specifically, upon the hand-operated switch 607 being operated, the relay 608 is turned ON in accordance with a control signal from the controller 512. The electric wire L105 is connected to the FI circuit module (ignition and fuel system) 609 and the meter circuit module (meter system) 610 through the relay 608, thereby allowing the power to be supplied from the battery 519 to the FI circuit module (ignition and fuel system) 609 and the meter circuit module (meter system) 610. In addition, the electric wire L105 is connected, through a relay 613, to a starter circuit (starter system) including a starter motor M and a starter switch 614, which are turned to an ON-state upon the relay 613 being turned ON.

The relay 608 is turned ON and OFF in accordance with a control signal from the controller 512, and is configured to supply the power from the battery 519 to the FI circuit 609, and to the meter circuit 610.

The relay 613 is turned ON and OFF in accordance with the control signal from the controller 512, and is configured to supply power from the battery 519 to the starter switch 614 and the starter motor M.

Each of the lock circuit module 611, the FI circuit module 609, and the meter circuit module 610 includes a CPU containing a built-in memory configured to store a correct user ID code therein. In each of the circuits 611, 609, and 610, to be precise, the CPU included therein is configured to execute a process for certifying the user ID code.

The lock circuit module 611, the FI circuit module 609, and the meter circuit module 610 are coupled to the controller 512 through a CAN (controller area network), and are configured to receive the received user ID code from the controller 512.

Figure 18:
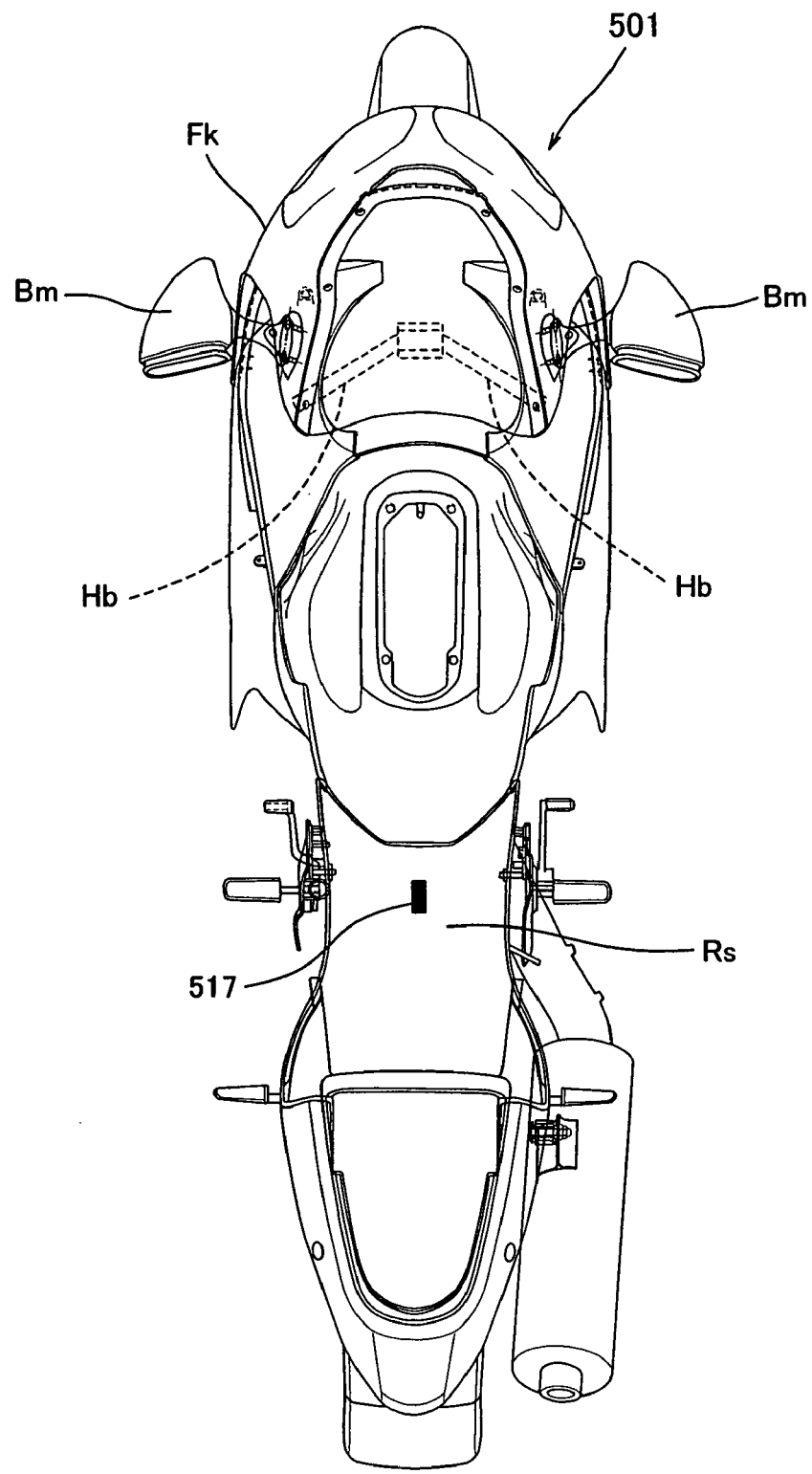
FIG. 18 is a plan view of an entire motorcycle according to the third embodiment.

In the third embodiment, the hand-operated switch 607 is a start/stop switch including a push button switch which is provided in the vicinity of a right grip of a handle bar Hb of the motorcycle 501 of FIG. 18 and which is configured exclusively for the theft prevention apparatus. In alternatives of the hand-operated switch 607, an existing "lap time start/stop switch" provided in the vicinity of the right grip of the handle bar Hb may be employed, or otherwise one position may be added to the kill switch and shifting to the position may be performed against a spring force.

In further alternative, the hand-operated switch 607, may be a dial switch 307 including a movable portion 307a capable of selecting a position from plural positions (three positions 1, 2, and 3 in the embodiment of FIG. 14), or other switch having another configuration, although not shown.

The start/stop switch, which is one type of the hand-operated switch 607, is configured to start-up and stop the engine by a short-time (about one second) operation and a long-time (about two to three seconds) operation. More specifically, by the short-time operation, a control for starting-up the engine starts, whereas by the long-time operation, a control for stopping the engine is executed.

In the third embodiment, as shown in FIG. 16, the controller 512 is connected to a display device 618 installed on, for example, a meter panel, through an electric wire L106. If the battery of the transmitter 502 of the theft prevention apparatus is running short of power, the transmitter 502 transmits this information to the receiver 511. Upon the receiver 511 receiving the signal, the controller 512 causes the display device 618 to display a warning indicating that "the battery of the transmitter 502 is running short of power", to be presented to the rider. According to the warning, the rider replaces the battery.

In FIG. 16, one-dotted lines connecting the respective block components indicate signal lines, solid lines indicate power lines, and broken lines indicate power lines through which the minute current is supplied.

In the third embodiment, the on-vehicle theft prevention apparatus A2 transmits to the transmitter 502 a request signal for requesting the transmitter 502 to transmit a predetermined transmitter detection signal. Upon receiving the request signal, the transmitter 502 transitions from a sleep mode to an active mode, and transmits the transmitter detection signal to the on-vehicle apparatus A2. During the mode state, the transmitter 502 is configured to consume only minute power for receiving the request signal.

The above mentioned theft prevention apparatus performs or disenables a theft prevention function as described below in detail. Hereinbelow, the control process or the like executed by the controller 512 and the associated theft prevention function will be described with reference to a flowchart of FIG. 17.

When the rider, carrying the transmitter 502 in the pocket, operates the hand-operated switch (start/stop switch) 607 of the motorcycle 501 for a short time (about one second) within a predetermined distance over which the transmitter 502 and the receiver 511 can communicate with each other (step S501), the controller 512 transitions from the sleep mode to the active mode. The controller 512 causes the relay 615 to be turned ON so that the power continues to be supplied from the battery 519 to the controller 512 (step S502). The controller 512 transmits a request signal to the transmitter 502 through the receiver 511 and the antenna 517 to request the transmitter 502 to transmit the potable device detection signal (step S503).

Receiving the request signal, a control unit (not shown) of the transmitter 502 transitions from the sleep mode (standby state) during which only minute power is consumed, to the active state, and determines whether or not the request signal matches a predetermined signal. If it is determined that the two signals match, the transmitter 502 transmits the transmitter detection signal to the controller 512 side. On the other hand, if it is determined that the two signals do not match, the control unit of the transmitter 502 does not transmit the transmitter detection signal to the controller 512 side. Thus, the controller 512 determines whether or not it has received the transmitter detection signal within a predetermined time after the controller 512 has transmitted the request signal (step S504). If it is determined that the controller 512 has received the transmitter detection signal within the predetermined time, the controller 512 advances the process to step S505. On the other hand, if it is determined that the controller 512 does not receive the transmitter detection signal within the predetermined time, the controller 512 detects whether or not a key with transponder containing a predetermined ID code to be described later has been inserted into a key switch of the motorcycle (step S530). If the key is detected as being uninserted, the control process for the theft prevention terminates. At this time, the FI lamp 612 is configured not to flash and the display device 618 is configured not to display any information to inhibit any mischievous attempt to operate the hand-operated switch 607 by a third party, which will cause the FI lamp 612 to flash or the display device 618 to display some information.

On the other hand, if the key is detected as being inserted into the key switch, the controller 512 advances the process to step S505.

Receiving the transmitter detection signal (step S505), the controller 512 determines whether or not the detection signal is associated with a first transmitter of transmitters 502 belonging to one group, based on a signal code contained in the transmitter detection signal (step S506). If it is determined that the signal code matches a predetermined signal code of the first transmitter 502, the controller 512 transmits a user ID code transmission request signal to the transmitter 502 to request the transmitter 502 to transmit the user ID code (step S507). On the other hand, if is determined that the signal code does not match the predetermined code of the first transmitter 502 in step S506, the controller 512 determines whether or not the signal code matches a predetermined code of a second transmitter 502 belonging the group (step S508), and then determines whether or not the signal code matches a predetermined code of a third transmitter belonging to the group if it is determined that the signal code does not match the predetermined code of the second transmitter 502 (step S509). In this manner, the controller 512 executes a determination process until detecting a match between the signal code and the transmitter 502. In this embodiment, since the number of the transmitters 502 belonging to the group is set to five, the controller 512 typically executes the determination process five times at maximum, although the controller 512 executes the determination process three times in the embodiment of FIG. 17. This configuration is intended for use by an entire family, so that up to five persons can share the motorcycle 201. It will be appreciated that the number of transmitters 502 belonging to the group may be more than or less than five.

Finally, if it is determined that the signal code does not match any of the predetermined codes of the transmitters 502, the controller 512 detects whether or not the key with transponder containing the predetermined code has been inserted into the key switch provided on the panel or the like of the motorcycle 501 (step S531). If the key is detected as being uninserted, the controller 512 terminates the control process for disenabling the theft prevention function.

On the other hand, if it is determined that the signal code matches that of any of the transmitters 502 in steps S508 to S509, or otherwise, the key is detected as being inserted into the key switch in step S531, the controller 512 advances the process to step S507.

Receiving the user ID code transmission request signal from the controller 512 in step S507, the transmitter 502 transmits the user ID code to the controller 512 side. The controller 512 receives the user ID code through the receiver 511 of the motorcycle 501 (step S510).

Receiving the user ID code transmitted from the transmitter 502, the controller 512 calls the correct user ID code stored in the memory 512m (step S511), and determines whether or not the received user ID code matches the correct user ID code (step S512). If it is determined that these two codes match, the controller 512 turns ON an electric circuit configured to supply power to the lock circuit module 611 and outputs a unlock request signal for executing an unlock process to the lock circuit module 611 via the CAN (step S513), and awaits a user ID code transmission request signal from the lock circuit module 611 to request the controller 512 to output the received user ID code from the transmitter 502 (step S514).

Receiving the unlock request signal, the lock circuit module 611 outputs the user ID code transmission request signal to the controller 512 via the CAN. Receiving the request signal, the controller 512 outputs the received user ID code to the lock circuit module 611 (step S515).

On the other hand, if it is determined that the two codes do not match in step S512, the key with transponder containing the predetermined code has been inserted into the key switch (step S532). If the key is detected as being uninserted, the controller 512 causes the FI lamp 612 to flash to inform the rider that the key is uninserted, and causes the display device 618 to display this information in the form of characters or graphic symbols (step S533). Thereby, the control process terminates.

The lock circuit module 611 is configured to execute the process for certifying the user ID code utilizing the CAN to prevent the motorcycle 501 from being stolen by changing a board (control board) of the controller 512. In step S533, the FI lamp 612 flashes and the display device 618 displays some information for the sake of the rider's convenience, since any mischievous attempt to operate the hand-operated switch 607 by a third party will not be made, once the controller 512 has certified the user ID code.

Receiving the user ID code, the CPU of the lock circuit module 611 determines whether or not the received user ID code matches the correct user ID code stored in the memory of the CPU. If it is determined that these two codes match, the electric circuit of the lock circuit module 611 is turned ON, thereby causing the motorcycle 501 to move to an unlocking-ON mode.

On the other hand, if it is determined that the two codes do not match, the motorcycle 501 does not move to the unlocking-ON mode unless the key with transponder is inserted into the key switch. In other words, an unlocking-OFF mode is maintained.

The lock circuit module 611 transmits a signal indicating "unlocking-ON" or "unlocking-OFF" to the controller 512, and thus, the control process for unlocking terminates.

The controller 512 determines whether the received signal from the lock circuit module 611 is "unlocking-ON" or "unlocking-OFF" (step S516). If it is determined that the received signal is "unlocking-ON", the controller 512 causes the display device 618 to display this information (step S517). In the unlocking-ON mode, the power is supplied from the battery 519 to the lock circuit module 611 through the relay 615 and the controller 512. Thereby, an actuator 617 activates, thereby unlocking the steering lock, the helmet lock, or the seat lock. In this case, in the third embodiment, since the power which is supplied to the lock actuator 617 is not so large, it is supplied to the lock circuit module 617 through the controller 512.

If it is determined that the received signal is "unlocking-OFF" in step S516, the controller 512 detects whether or not the key with transponder has been inserted into the key switch (step S534). If the key is detected as being uninserted, the controller 612 causes the FI lamp 612 to flash and the display device 618 to display this information (step S535), and thus the control process for disenabling the theft prevention function of the theft prevention apparatus terminates. In this case, the theft prevention function is maintained.

If the key is detected as being inserted into the key switch in step S534, the controller 512 advances the process to step S517.

The display device 618 displays the information regarding "unlocking-ON" or "unlocking-OFF" in step S535 to present the rider with this information, since the display of the information on the display device 618 does not result from mischievous attempt by a third party, once the controller 512 has certified the user ID code.

With only the lock circuit module (lock system) 611 in unlocking-ON mode, the rider can push and move the motorcycle 501.

In the unlocking-ON mode, the lock circuit module 611 activates a built-in timer from the time point when the lock circuit module 611 has moved to the unlocking-ON mode. The controller 512 determines whether or not a second "short-time operation" to be described later has been performed or the signal from the transmitter 502 has been received (steps S518). If it is determined as such, the process does not advance to a next step. Thus, where the signal from the transmitter 502 has not been received and the "short-time operation" has not been performed within a predetermined time, for example 10 minutes, the controller 512 causes the lock circuit module 611 to transition to an unlocking-OFF state (step S519) to thereby cause the steering lock, the seat lock, or the like to turn to an ON-state, thus enabling the theft prevention function to prevent theft of the motorcycle 501. Thus, the control process for unlocking that is associated with the lock circuit module 611 and the controller 512 terminates.

After the unlocking-ON process has finished, if the rider re-operates the hand-operated switch 607 for a short time within a predetermined time, the controller 512 turn ON the relay 608 (step S520), and the power is supplied to the meter circuit module 610 and the FI circuit module 609 (step S521).

The meter circuit module 610, being supplied with the power, outputs, via the CAN, a user ID code transmission request signal to the controller 512 to request the controller 512 to output the user ID code. Receiving the request signal, the controller 512 outputs the user ID code to the meter circuit module 610 (step S522).

The controller 512 determines whether or not it has received the user ID code transmission request signal from the meter circuit module 610 within a predetermined time (about 30 seconds) (step S523). If it is determined that the request signal has not been received, the controller 512 causes the FI lamp 612 to flash to inform the rider of this, or causes the display device 618 to display this information in the form of characters or graphic symbols to be presented to the rider (step S536). Thereby, the control process for the meter circuit module 610 terminates, and hence the meter circuit module 610 remains inactive. As a result, the theft prevention function is maintained. On the other hand, if it is determined that it has received the request signal, the controller 512 outputs the user ID code to the meter circuit module 610 via the CAN (step S524).

The meter circuit module 610 is configured to execute the process for certifying the user ID code utilizing the CAN to prevent the motorcycle 501 from being stolen by changing boards of the controller 512 and the lock circuit module 611. In step S536, the FI lamp 612 flashes and the display device 618 displays some information to inform the rider that the user ID code transmission request signal is not transmitted from the meter circuit module 610, since the flash of the FI lamp 612 or the display of the information on the display device 618 does not result from mischievous attempt by a third party, once the controller 512 has certified the user ID code.

Receiving the user ID code from the controller 512, the CPU of the meter circuit module 610 determines whether or not the received user ID code matches the correct user ID code stored in the memory of the CPU included in the meter circuit module 610. If it is determined that these two user ID codes match, the meter circuit module 610 is turned to an ON-state (active state). In the third embodiment, when the meter circuit module 610 moves to the ON-state (active state), meters or gauges move to an active state, and head lamps or the like also move to an active state.

On the other hand, if it is determined that the two codes do not match, the meter circuit module 610 remains in an OFF-state (inactive state) unless the key with transponder is inserted into the key switch. In this state, the meters or gauges of the motorcycle 501 remain in the inactive state, and thus the theft prevention function is active.

The meter circuit module 610 transmits a signal indicating "match" or "mismatch" to the controller 512.

The controller 512 receives the signal indicating "match" or "mismatch" from the meter circuit 610 and detects whether the received signal is "match" or "mismatch" (step S525). If the received signal is detected as being "match", the controller 512 causes the display device 618 to display this information (step S526).

On the other hand, if the received signal is detected as being "mismatch", the controller 512 detects whether or not the key with transponder has been inserted into the key switch (step S537). If the key is detected as being uninserted, the controller 512 causes the FI lamp 612 to flash and the display device 618 to display this information (step S538). Thus, the control process for the meter circuit module 610 terminates, and the meter circuit module 610 remains in an inactive state. As a result, the theft prevention function is maintained. On the other hand, if the key is detected as being inserted into the key switch in step S537, the controller 512 advances the process to step S526.

Then, when the meter circuit module 610 moves to an active state, the controller 512 moves to a standby mode to await a user ID code transmission request signal from the FI circuit module 609 to request the controller 512 to output the user ID code. The FI circuit module 609 outputs a user ID transmission request signal to the controller 512 via the CAN. Receiving the request signal, the controller 512 outputs the user ID code to the FI circuit module 609 via the CAN (step S527).

If the request signal is not transmitted from the FI circuit module 609 within a predetermined time (about 30 seconds), the controller 512 causes the FI lamp 612 to flash to inform the user that the request signal is not transmitted, and causes the display device 618 to display this information in the form of characters or graphic symbols to be presented to the rider (step S528).

The FI circuit module 609 is configured to execute the process for certifying the user ID code utilizing the CAN to prevent the motorcycle 501 from being stolen by changing the controller 512, the lock circuit module 611 and the meter circuit module 610. In step S528, the FI lamp 612 flashes and the display device 618 displays some information to inform the rider that the user ID code transmission request signal is not transmitted from the FI circuit module 609, since the flash of the FI lamp 612 or the display of the information on the display device 618 does not result from a mischievous attempt by a third party, once the controller 512 has certified the user ID code.

Receiving the user ID code from the controller 512, the CPU of the FI circuit module 609 determines whether or not the received user ID code matches the correct user ID code stored in the memory of the CPU included in the flash circuit 609. If it is determined that these two codes match, the controller 512 turns the FI circuit module 609 to an ON-state (active state). Thereby, the fuel supply system of the engine becomes active and the ignition system of the engine becomes active.

On the other hand, if it is determined that the two codes do not match, the FI circuit module 609 remains in an OFF-state (inactive state) unless the key with transponder is inserted into the key switch. As a result, no fuel is supplied to the engine and the ignition system and the start-up system maintain an OFF-state. Under this condition, the engine of the motorcycle 501 cannot start-up, and thus the theft prevention function is active.

The FI circuit module 609 outputs a signal indicating "match" or "mismatch" to the controller 512. Receiving the signal indicating "match" or "mismatch" from the FI circuit module 609, the controller 512 detects whether the received signal is "match" or "mismatch" (step S529). If the received signal is detected as being "match", the controller 512 causes the display device 618 to display this information, and causes the relay 613 to be turned ON (step S541). Thereby, the start-up system of the engine moves to an ON-mode.

When the FI circuit module 609 moves to an ON-state, the controller 512 causes the flasher 605 to flash to inform the rider that all the theft prevention functions equipped in the motorcycle 501 have been disenabled (step S542). Thus, the control process for the theft prevention function terminates.

The flashing of the flasher 605, which is an answerback, informs the rider that the motorcycle 501 is now ready to start-up of the engine and is steerable.

On the other hand, if the received signal is detected as being "mismatch" in step S529, the controller 512 detects whether or not the key with transponder has been inserted into the key switch (step S539). If the key is detected as being uninserted, the controller 512 causes the FI lamp 512 to flash, and causes the display device 618 to display this information (step S540). Thus, the control process for the FI circuit module 609 terminates, and the FI circuit module 609 remains in an inactive state. As a result, the theft prevention function is maintained. If the key is detected as being inserted into the key switch, the controller 512 advances the process to step S541.

The controller 512 is configured to advance the process to a subsequent step, if the key with transponder is detected as being inserted into the key switch of the motorcycle 501 and if the ID code stored in the transponder matches the correct ID code, even when it is determined that the signal code of the transmitter detection signal is not the predetermined code, or it is determined that the received user ID code does not match the correct user ID code. This will be explained with reference to a flowchart indicated by a broken line of FIG. 17.

As should be appreciated, in cases where the rider has the key with transponder without carrying the transmitter 502, the rider can ride the motorcycle 501 having the above-mentioned theft prevention function. Conveniently, the user may carry the transmitter 502 in a pocket or a bag, or otherwise, while the key with transponder is inserted into the key switch.

While the step for certifying the user ID code is carried out in the meter circuit module 610 and then in the FI circuit module 609, the step may be carried out in a reverse order, or otherwise at the same time.

The step for certifying the user ID code may be performed in components configured to be controlled for theft prevention, which are other than the lock circuit module 611, the meter circuit module 610, and the FI circuit module 609, including a car navigation system, an audio system, etc. In those cases, the theft prevention function is further enhanced.

A control process for cases where the transmitter 502 has been lost is executed as in the second embodiment, and will not be further described.

Hereinbelow, a function of the theft prevention apparatus for the case where the engine stops will be described.

The theft prevention apparatus is configured such that, when the engine is starting-up after the above mentioned steps or before the engine starts-up, the rider operates the hand-operated switch 607 for a long time to stop the engine, or otherwise to cancel a control operation being executed to enable the engine to start-up, thus returning to an initial state.

Upon the hand-operated switch 607 being operated for a long time, the controller 512 executes the determination process in steps S502 to S505 to determine whether or not the rider carries the predetermined transmitter 502, and causes the display device 618, the FI lamp 612 and the like, to warn the rider that, if the rider were to try to stop the engine without carrying the transmitter 502, the engine could not be re-started back up. In this state, if the hand-operated switch 607 is re-operated for a long time, then the relays 607 and 615 are turned OFF, and the FI circuit module 609, the meter circuit module 610, and the lock circuit module 611 turn to OFF-states. In addition, the relay 613 is turned OFF. Thereby, the engine stops and is configured not to re-start up. Since the rider must operate the hand-operated switch 607 for a long time twice to stop the engine, the display device 618 and the FI lamp 612 display the information to be presented to the rider during this engine stop process. This makes it possible to inhibit the rider from unintentionally performing an engine stop operation.

In accordance with the theft prevention apparatus configured as described above, since the lock circuit module 611, the meter circuit module 610, and the FI circuit module 609, as well as the controller 512, are configured to perform the step for certifying the user ID code, the theft of the motorcycle 501 is effectively prevented. Any theft attempt will be unsuccessful unless all of these circuits have been changed. Thus, the theft prevention function is enhanced. In addition, the rider can start-up the engine easily with the transmitter 502 in a pocket. Furthermore, stoppage of the engine can be effectively inhibited if the transmitter 502 is lost.

As in the theft prevention apparatus of the second embodiment, in the theft prevention apparatus of the third embodiment, since only minimum power is necessary to keep "sleep mode" of the controller 512 before the hand-operated switch 607 is operated, and hence the power is not substantially consumed on the motorcycle 501 side, wasteful power consumption is inhibited. In addition, since the transmitter 502 of the theft prevention apparatus also remains in the sleep mode and consumes minute power before the on-vehicle apparatus A2 transmits a request signal for transmitting the transmitter detection signal to the transmitter 502, wasteful power consumption is inhibited.

The engine control unit (ECU) of the motorcycle 501, or otherwise, another controller may function as the controller 512 of the third embodiment. Nonetheless, the ECU is desirably employed as the controller 512, without an increase in the number of components and an increase in manufacturing cost.

The hand-operated switch 607 may be another suitable switche, for example, a pull-in switch or the like positioned around a meter or gauge in the vicinity of the steering head of the handle.

The present invention is applicable to leisure vehicles such as motorcycles, all terrain vehicles, or personal watercraft (PWC) which are equipped with rider's seats which are open to the outside.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A theft prevention apparatus of a leisure vehicle equipped with a rider's seat which is open to the outside, the theft prevention apparatus comprising:

a vehicle receiver mounted in the vehicle and including a vehicle transmitter configured to transmit a request signal by radio at predetermined travel distance intervals during travel of the vehicle;

a portable transmitter including a transmitter receiver configured to receive the request signal which is transmitted by radio from the vehicle transmitter of the receiver, the portable transmitter being configured to transmit a reply signal by radio to the vehicle receiver in response to the request signal, the reply signal being received by the vehicle receiver;

a controller coupled to the vehicle receiver through a signal line or by radio; and an alarm device mounted in the vehicle and configured to indicate an alarm to inform the rider that the portable transmitter has been lost;

wherein the controller is configured to determine whether or not the vehicle receiver has received the reply signal transmitted from the portable transmitter within a predetermined time after the vehicle receiver has transmitted the request signal by radio to the portable transmitter, and to execute control to cause the alarm device to indicate the alarm when the controller determines that the vehicle receiver does not receive the reply signal within the predetermined time; and wherein the controller is configured to reduce a transmission interval of the request signal which is transmitted by radio from the vehicle transmitter, when the vehicle receiver does not receive the reply signal which is to be transmitted in response to the request signal.

2. A theft prevention apparatus of a leisure vehicle equipped with a rider's seat which opens outside, the theft prevention apparatus comprising:

a vehicle receiver mounted in the vehicle and including a vehicle transmitter configured to transmit a request signal by radio at predetermined time intervals during a stopped state of the vehicle or at predetermined travel distance intervals during travel of the vehicle;

a portable transmitter including a transmitter receiver configured to receive the request signal which is transmitted by radio from the vehicle transmitter of the receiver, the portable transmitter being configured to transmit a reply signal by radio to the receiver in response to the request signal, the reply signal being received by the vehicle receiver;

a controller coupled to the vehicle receiver through a signal line or by radio; and an alarm device mounted in the vehicle and configured to indicate an alarm to inform the rider that the portable transmitter has been lost;

wherein the controller is configured to determine whether or not the vehicle receiver has received the reply signal transmitted from the portable transmitter within a predetermined time after the vehicle receiver has transmitted the request signal by radio to the portable transmitter, and to execute control to cause the alarm device to indicate the alarm when the controller determines that the vehicle receiver does not receive the reply signal within the predetermined time; and wherein the controller is configured to reduce a transmission interval of the request signal which is transmitted by radio from the vehicle transmitter, when the vehicle receiver does not receive the reply signal which is to be transmitted in response to the request signal.

3. A theft prevention apparatus of a leisure vehicle equipped with a rider's seat which is open to the outside, the theft prevention apparatus comprising:

a vehicle receiver mounted in the vehicle and including a vehicle transmitter configured to transmit a request signal by radio at predetermined travel distance intervals during travel of the vehicle;

a portable transmitter including a transmitter receiver configured to receive the request signal which is transmitted by radio from the vehicle transmitter of the receiver, the portable transmitter being configured to transmit a reply signal by radio to the vehicle receiver in response to the request signal, the reply signal being received by the vehicle receiver;

a controller coupled to the vehicle receiver through a signal line or by radio;

an alarm device mounted in the vehicle and configured to indicate an alarm to inform the rider that the portable transmitter has been lost; and an engine mounted in the vehicle and configured to generate a driving power for driving the vehicle;

wherein the controller is configured to determine whether or not the vehicle receiver has received the reply signal transmitted from the portable transmitter within a predetermined time after the vehicle receiver has transmitted the request signal by radio to the portable transmitter, and in response to the controller determining that the receiver does not receive the reply signal within the predetermined time, the controller is further configured to execute control to cause the alarm device to indicate the alarm and not to execute control of the engine based on the determination; and wherein the controller is configured to reset, to a value that is substantially equal to a travel distance from a first detection that the reply signal is not received, a travel distance meter equipped in the vehicle or data regarding an elapse of time, (to enable the rider to easily find where the portable transmitter has fallen off), when the controller determines that the vehicle receiver does not receive the reply signal in response to the request signal.

4. A theft prevention apparatus of a leisure vehicle equipped with a rider's seat which opens outside, the theft prevention apparatus comprising:

a vehicle receiver mounted in the vehicle and including a vehicle transmitter configured to transmit a request signal by radio at predetermined time intervals during a stopped state of the vehicle or at predetermined travel distance intervals during travel of the vehicle;

a portable transmitter including a transmitter receiver configured to receive the request signal which is transmitted by radio from the vehicle transmitter of the receiver, the portable transmitter being configured to transmit a reply signal by radio to the receiver in response to the request signal, the reply signal being received by the vehicle receiver;

a controller coupled to the vehicle receiver through a signal line or by radio;

an alarm device mounted in the vehicle and configured to indicate an alarm to inform the rider that the portable transmitter has been lost; and an engine mounted in the vehicle and configured to generate a driving power for driving the vehicle;

wherein the controller is configured to determine whether or not the vehicle receiver has received the reply signal transmitted from the portable transmitter within a predetermined time after the vehicle receiver has transmitted the request signal by radio to the portable transmitter, and in response to the controller determining that the receiver does not receive the reply signal within the predetermined time, the controller is further configured to execute control to cause the alarm device to indicate the alarm and not to execute control of the engine based on the determination; and wherein the controller is configured to reset, to a value that is substantially equal to a travel distance from a first detection that the reply signal is not received, a travel distance meter equipped in the vehicle or data regarding an elapse of time, (to enable the rider to easily find where the portable transmitter has fallen off), when the controller determines that the vehicle receiver does not receive the reply signal in response to the request signal.

5. The theft prevention apparatus according to claim 3,
wherein the request signal is a user identification code request signal and the reply signal is a user identification code; and
wherein the controller is configured to, upon reception of the user identification code, compare the received user identification code to a correct user identification code stored therein to determine whether or not the received user identification code matches the correct user identification code.

6. The theft prevention apparatus according to claim 4,
wherein the request signal is a user identification code request signal and the reply signal is a user identification code; and
wherein the controller is configured to, upon reception of the user identification code, compare the received user identification code to a correct user identification code stored therein to determine whether or not the received user identification code matches the correct user identification code.

7. The theft prevention apparatus according to claim 3,
wherein the controller determines that the vehicle receiver does not receive the reply signal when the vehicle receiver does not receive the reply signal which is to be transmitted in response to the request signal which has been transmitted plural times.

8. The theft prevention apparatus according to claim 4,
wherein the controller determines that the vehicle receiver does not receive the reply signal when the controller determines that the vehicle receiver does not receive the reply signal which is to be transmitted in response to the request signal which has been transmitted plural times.

9. The theft prevention apparatus according to claim 4,
wherein the travel distance meter is a trip meter.

10. The theft prevention apparatus according to claim 3,
wherein the portable transmitter includes a self-indicator configured to operate when determining that the transmitter receiver does not receive the request signal.

11. The theft prevention apparatus according to claim 4,
wherein the portable transmitter includes a self-indicator configured to operate when determining that the transmitter receiver does not receive the request signal.

12. The theft prevention apparatus according to claim 11,
wherein the self-indicator is a light emitting device or an alarm sound emitter.

13. A theft prevention apparatus of a leisure vehicle equipped with a rider's seat which is open to the outside, the theft prevention apparatus comprising:
a portable transmitter configured to transmit a signal by radio at intervals during travel of the vehicle;
a vehicle receiver mounted in the vehicle and configured to receive the signal which is transmitted by radio from the portable transmitter;
a controller coupled to the vehicle receiver through a signal line or by radio;
an alarm device mounted in the vehicle and configured to indicate an alarm to inform the rider that the portable transmitter has been lost; and
an engine mounted in the vehicle and configured to generate a driving power for driving the vehicle;
wherein the controller is configured to determine whether or not the vehicle receiver has received the signal transmitted from the portable transmitter during travel of the vehicle, and in response to the controller determining that the vehicle receiver does not receive the signal, the controller is further configured to execute control to cause the alarm device to indicate the alarm and not to execute control of the engine based on the determination, and
wherein the controller is configured to reset, to a value that is substantially equal to a travel distance from a detection that the signal is not received, a travel distance meter equipped in the vehicle or data regarding an elapse of time, when the controller determines that the vehicle receiver does not receive the signal.

14. The theft prevention apparatus according to claim 13,
wherein the controller is configured to determine that the vehicle receiver does not receive the signal when the vehicle receiver does not receive the signal a predetermined number of times, and
wherein the travel distance is a distance from a first detection that the signal is not received.

15. The theft prevention apparatus according to claim 13,
wherein the portable transmitter includes a self-indicator configured to operate when determining that a transmitter receiver does not receive a request signal.

16. The theft prevention apparatus according to claim 14,
wherein the self-indicator is a light emitting device or an alarm sound emitter.

* * * * *

UNITED STATES PATENT AND TRADEMARK OFFICE
CERTIFICATE OF CORRECTION

| | | |
|---|---|---|
| PATENT NO. | : 7,656,278 B2 | Page 1 of 1 |
| APPLICATION NO. | : 11/112866 | |
| DATED | : February 2, 2010 | |
| INVENTOR(S) | : Onishi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Thirtieth Day of November, 2010

David J. Kappos
*Director of the United States Patent and Trademark Office*